(12) United States Patent
Dodge et al.

(10) Patent No.: US 7,266,544 B1
(45) Date of Patent: Sep. 4, 2007

(54) METHOD OF PERFORMING AN INTERACTIVE PHOTOGRAPHIC ASSIGNMENT

(76) Inventors: Sharon D. Dodge, 3033 13th Ave. West, Seattle, WA (US) 98119-2021; Brian L. Matthews, 10513 SE. 219th South, Kent, WA (US) 98031-2568

( * ) Notice: Subject to any disclaimer, the term of this patent is extended or adjusted under 35 U.S.C. 154(b) by 0 days.

(21) Appl. No.: 09/551,420

(22) Filed: Apr. 18, 2000

(51) Int. Cl.
G06F 7/00 (2006.01)
G06F 17/30 (2006.01)
G07G 1/12 (2006.01)
G07G 5/00 (2006.01)
G07F 7/00 (2006.01)

(52) U.S. Cl. .................. 707/3; 707/4; 707/5; 707/6; 707/1; 707/24; 707/27

(58) Field of Classification Search .............. 713/200, 713/201; 705/26–27, 14, 10, 1, 24; 707/10, 707/3, 6

See application file for complete search history.

(56) References Cited

U.S. PATENT DOCUMENTS

| 6,049,877 | A * | 4/2000 | White ........................ 713/201 |
| 6,167,382 | A * | 12/2000 | Sparks et al. ................. 705/26 |
| 6,496,936 | B1 * | 12/2002 | French et al. ............... 713/201 |
| 6,587,835 | B1 * | 7/2003 | Treyz et al. .................. 705/14 |
| 6,633,875 | B2 * | 10/2003 | Brady ......................... 707/10 |
| 6,980,964 | B1 * | 12/2005 | Cocotis et al. ................ 705/26 |

* cited by examiner

*Primary Examiner*—Kambiz Zand
*Assistant Examiner*—Arezoo Sherkat
(74) *Attorney, Agent, or Firm*—Stratton Ballew PLLC

(57) ABSTRACT

A method for electronically generating and assigning a photograph is provided. The method employs a server-based control program and preferably utilizes an Internet web browser to interface with users. The control program receives a photograph request from a user and issues a user identification and an access code for that specific user. The control program then receives a photograph specification from the user, the specification detailing the criteria for the photograph, such as size, style and media. The user may be a single customer or a group. The user searches a photographer data base for a photographer that corresponds to user's needs. The program then transmits the specifications to the selected photographers. The control program co-ordinates the user's review and/or approval of submissions by the photographer in response to the user's specifications. When the photographic assignment submittal is finally approved as submitted, the transaction is closed, with the control program performing appropriate notification and billing functions. The time and complexity involved in photographic assignment is significantly reduced, while still meeting the needs of the users in providing a private and secure photographic assignment. For each progressing project, the photographic assignment control program can receive revisions and comments from any number of users, and track the revision history of a current project or a past project, from initiation to completion.

14 Claims, 21 Drawing Sheets

Photographer: Photographer *x*

Photograph Usage Specification:

Destination:  ○ Cover Photograph   ○ Internal Photograph

Size: [          ]

Print run: [          ]

Buyout desired:   ○ Yes      ○ No

Format needed: [          ]

( Next )

METHOD OF PERFORMING AN INTERACTIVE PHOTOGRAPHIC ASSIGNMENT

TECHNICAL FIELD

The invention relates to a method of performing an assignment of a photographic project, and more particularly to a method of interactively assigning and tracking a photographic project with a web browser over the Internet.

BACKGROUND OF THE INVENTION

The business process of photographic assignment has changed very little from the early days of photography, even with the Internet revolution. Photographic project assignment is essentially performed in a one-on-one environment. A lengthy and cumbersome photographer selection process is normally followed by a negotiation between the photographer and the client or customer to arrive at a cost estimate and understanding of what the final product should include. Hopefully, the photographer and the client have the same concept of the final product. However, as is frequently the case, the final product can differ greatly from the client's preconception. The actual cost of the final product can also vary considerably from the initial estimate made by an eager photographer. Cost overruns, misunderstandings and price disputes all lead to strains on the client and photographer relationship that often result in resentment, rejections and even leading sometimes to the necessity of court sought resolutions. This interaction between the photographer and the customer is also complicated by a customer that for modern photographic project assignments consists of a group, panel, board or consortium, of which all members require review and control over the assignment process.

The conventional photographic project assignment process typically begins with the client or customer, who is often an art director or advertising executive. The customer will review the work of one or more photographers from a variety of sources that are often randomly encountered works, including word of mouth and published sources or can include portfolios and prior, similar projects involving the customer and a potential photographer. The customer chooses a photographer whose style and general subject matter or level of expertise suit the requirements of the job and the customer's taste, or whose work exhibits the subject matter to be photographed or the look and feel the customer is seeking. Depending on how discerning the client, this choice can be made based upon a generalized category of style or subject matter, to differences in subtle lighting or problem solving demonstrated in a body of work.

The Internet provides a means for many individuals to interact with each other in new ways. If the Internet could provide a means to standardize and simplify the interaction between a photographer and a customer or group of customers, a significant reduction in the time and complexity involved in photographic project assignment could be realized. However, an Internet based photographic project assignment system is not currently available, and for good reasons. The intricacies of photographer selection, cost estimates, media or format requirements, model selection, approvals, reviews, feedback and billing have so far made photographic assignments too complex a task to be performed over the Internet. A streamlined method is needed for making and tracking the many selections and decisions required in photographic project assignments.

Also, revisions and changes are common in photo shoots. For example, art directors may decide they want more shots, alternative props or require additional previews of the finished product, often called "Polaroids." Additionally, pricing for change orders as well all other cost estimations involved in photographic assignments are inaccurate and inconsistent, at best. A method is needed for making, approving and tracking change orders and cost estimates in photographic project assignments.

SUMMARY OF INVENTION

The present invention provides a method for electronically specifying, negotiating, generating, and assigning a photographic assignment project. The method employs a server-based control program and preferably utilizes an Internet web browser to interface with the users of the assignment process. The users can include a client or group of clients, a photographer or photographers, and the program host or server.

Each user is uniquely identified when the host's control program receives a photographic assignment request from a user and issues a user identification and an access code for that specific user. The user may have preselected one or more photographers for the assignment project, or the control program can allow the user to search a photographer data base for one or more photographers that fit the user's requirements. The results of the search of the photographer data base by the control program include a photographer name and additional information similar to a portfolio for the photographer. These results are generated and then transmitted to the user. The user reviews the results and then responds back to the control program.

The control program then receives a photographic assignment specification from the user, preferably in the form of a questionnaire or query formulated by the control program based upon input from the user. The specification details the criteria for the photographic assignment. This specification can include, for example, the usage required on the photographs, how many shots, where and when the shots are to be performed, what film format, whether the photographs will include models, and if so what sort and how many.

After the control program receives an approval of the photographer and specification from the user, the control program then generates a photograph request for the approved photographer. The control program transmits the photograph specification in the form of a request to the photographer and the photographer responds with a photographic assignment specification acceptance to the control program.

The present invention preferably employs information the photographers provide, from a data base created automatically in response to questionnaire items. The photographers have the ability to review and fine tune the generated estimates as desired to reflect requirements that are unique to the project. The photographers can adjust the project quotation or bid slightly more or less than the program-generated estimate that was based on project specifications.

The control program receives the acceptance from the photographer and generates a photographic assignment submittal for review by the user. The submittal is transmitted by the control program to the user. At this point the user may approve the photographic assignment submittal or revise the submittal and send it back to the photographer via the control program, for revision. When the photographic assignment submittal is approved as submitted, the control program receives the photographic assignment approval from the user and the transaction is essentially closed, with the control program performing appropriate notification and billing functions.

If, however, the client or photographer require or desire changes to the project, a change order can be submitted. The control program receives the change order request, which can adjust the job specification, which may result in a change in the cost of the project. In the present invention, the customer must approve all cost increases and changes and employ their customer approval code to allow the job to proceed, with the customer agreeing to and acknowledging financial responsibility for any extra charges.

The control program transmits the change order request to the photographer and the photographer responds with a revised photograph submittal to the control program. The control program again receives the photograph estimate from the photographer, as revised in the change order, and generates a revised photograph submittal for review by the user. The submittal is again transmitted by the control program to the user.

At this point the user may again either approve the photograph change order submittal or revise the submittal and send it back to the control program for revision. When the photograph submittal is finally approved as submitted, the control program receives the photograph approval from the user and the transaction is closed, with the control program performing appropriate notification and billing functions.

The invention preferably employs the Internet to interact with the client and photographer users of the control program. A significant reduction in the time, complexity and uncertainty involved in the photographic assignment is realized through the novel control program that this invention provides. The intricacies of photographer selection, media, photograph, approvals, reviews, feedback and billing photographic assignment are coordinated and simplified into a series of specific functions of the control program of the present invention. The control program meets the needs of the users in providing a private and secure photographic assignment. For each progressing project, the photographic assignment control program can receive revisions and comments from any number of users, and track the revision history of the project from initiation to completion.

DETAILED DESCRIPTION OF SPECIFIC EMBODIMENTS

The invention employs an Internet web browser to provide a method of assigning and generating a photographic project assignment. The method of the invention requires a three-way interactive, graphical and intelligent interface between a client, a photographer and a host service provider to achieve a desired end product.

FIGS. 1 through 20 schematically detail a preferred implementation of the present invention in a computer server program. The server-based program, in conjunction with the appropriate computer related devices as schematically shown in FIG. 16, has the ability to perform the specific tasks as described, preferably with an Internet-based browser interfacing with the server-based program. Graphical web browsers such as Internet Explorer, Netscape Navigator, Opera, and Mosaic are commercially available; text-based browsers such as Lynx are also available.

Figure 1:
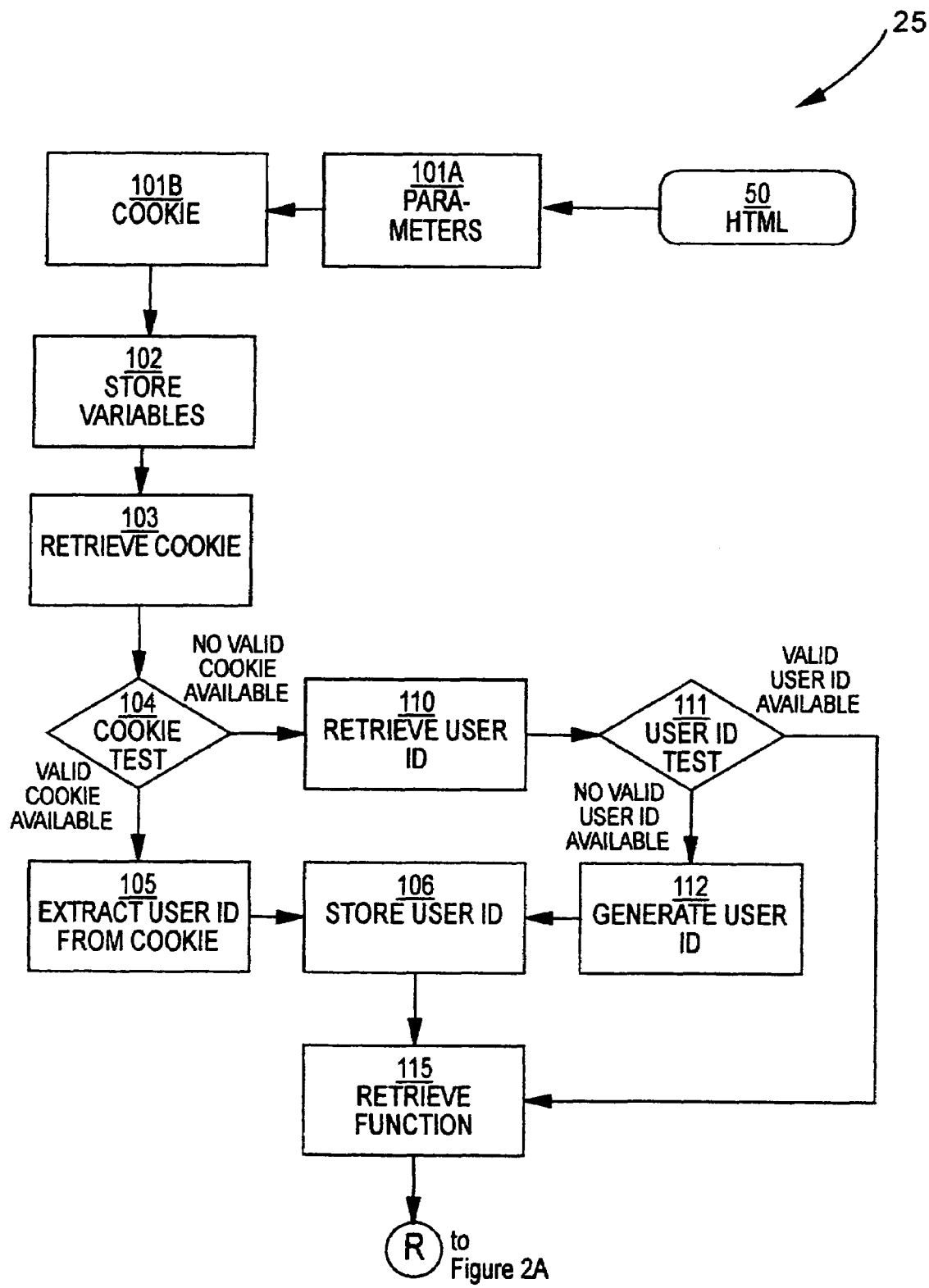
FIG. 1 is a flow diagram of the invention.

FIG. 1 begins to describe a preferred implementation of the present invention wherein a control program 25 performs all software related functions associated with the invention. The "Hypertext Markup Language" (HTML) 50 generated by the control program 25 specifies a "Common Gateway Interface" (CGI). The CGI allows the transfer of information between a server 1602 as shown in FIG. 16, which is connected to the World Wide Web (WWW) through the graphical interface of a web page 1618. The control program is designed to accept and return data that conforms to the CGI specification. The control program can be written in any programming language, for example "C," "Perl," "Java," or "Visual Basic."

CGI parameter information specifying the function to be performed by subsequent invocations of the control program 25 responds to client, photographer and site administrator actions. The client, photographer and site administrator of the control program can collectively be referred to as users. An alternate implementation of the single control program consists of a plurality of control programs, each performing one or more of the functions associated with the invention. The HTML generated by one of the control programs specifies the control program or programs to invoke based upon inputs from the users. These subsequent control programs may be the same or different control programs than the program that generated the HTML.

In FIG. 1, a set of CGI parameters is obtained from the environment within which the control program is running and decoded. This acquisition and decoding of the CGI parameters is a standard web function, well known and easily accomplished by any technician versed in the art of web page programming. Preferably, the set of CGI parameters is obtained and decoded from a QUERY_STRING environment variable in a Parameters function block 101A. The QUERY_STRING is a standard input in the HTML format. This acquisition of the CGI parameters is also a standard web function, well known and easily accomplished by any technician versed in the art of web page programming. The CGI parameters include information entered by the user, as well as "hidden" parameters used to identify the user, function and subfunction requested. At a Cookie function block 101B, an HTTP_COOKIE environment variable containing a "cookie" is obtained. "Cookie" is a well-known term of art for a specific type of message exchanged between a web browser and a web server. The browser stores the cookie locally on the computer running the browser. The cookie is then sent back to the server each time the browser requests a page from the server. A primary purpose of cookies in the present invention is to identify a user and prepare customized Web pages for that user. The cookie information need not be present, and in fact may be disabled by the web browsers of certain users.

The order of function blocks 101A and 101B are interchangeable, and the information gathered in them is stored as variables by the Store Variables function block 102. The variables stored can include registration information, cookies, customer comments, a USER_IDENTIFIER, a PROJECT_IDENTIFIER, a FUNCTION_CODE, and a SUBFUNCTION_CODE. A Retrieve Cookie function block 103 retrieves the cookie stored in function block 102 from memory. A Cookie Test decision block 104 tests if the cookie retrieved in the function block 103 is present and contains a valid identifier and a valid USER_IDENTIFIER. If so, the program continues to an Extract User Identifier from Cookie function block 105; otherwise, the program goes to a Retrieve User Identifier function block 110.

In the Extract User Identifier from Cookie function block 105, the USER_IDENTIFIER is extracted from the cookie retrieved in the function block 103. The program may be configured to perform this function contemporaneously with the test performed in the decision block 104. From function block 105 the control program 25 proceeds to a Store User Identification function block 106. Function block 106 stores the USER_IDENTIFIER from function block 105 as a variable.

In the Retrieve User Identifier function block 110, the USER_IDENTIFIER is retrieved from the parameters entered in function block 101A and stored in function block 102. The control program then proceeds to a User Identification Test decision block 111, in which the USER_IDENTIFIER retrieved in function block 110 is tested. If the USER_IDENTIFIER is present and valid the program proceeds to a Retrieve Function function block 115; otherwise, a Generate User Identifier function block 112 is performed. In function block 112, performed when no USER_IDENTIFIER is available from the cookie or CGI parameters, an appropriate customer identifier is generated. The preferred implementation uses information from the environment in which the control program is running, such as the current time and the IP address of the user's computer, to generate the USER_IDENTIFIER; however, any method available to those versed in the art of generating a unique identifier can be used.

Function block 115 retrieves a FUNCTION_CODE from memory that was determined by the CGI parameters stored in function block 102. The function code determines which of several possible functions the control program will perform. The state of the FUNCTION_CODE corresponds to an input of the user into the web browser, this input being a direct response to HTML generated by the control program 25.

Figure 2A:
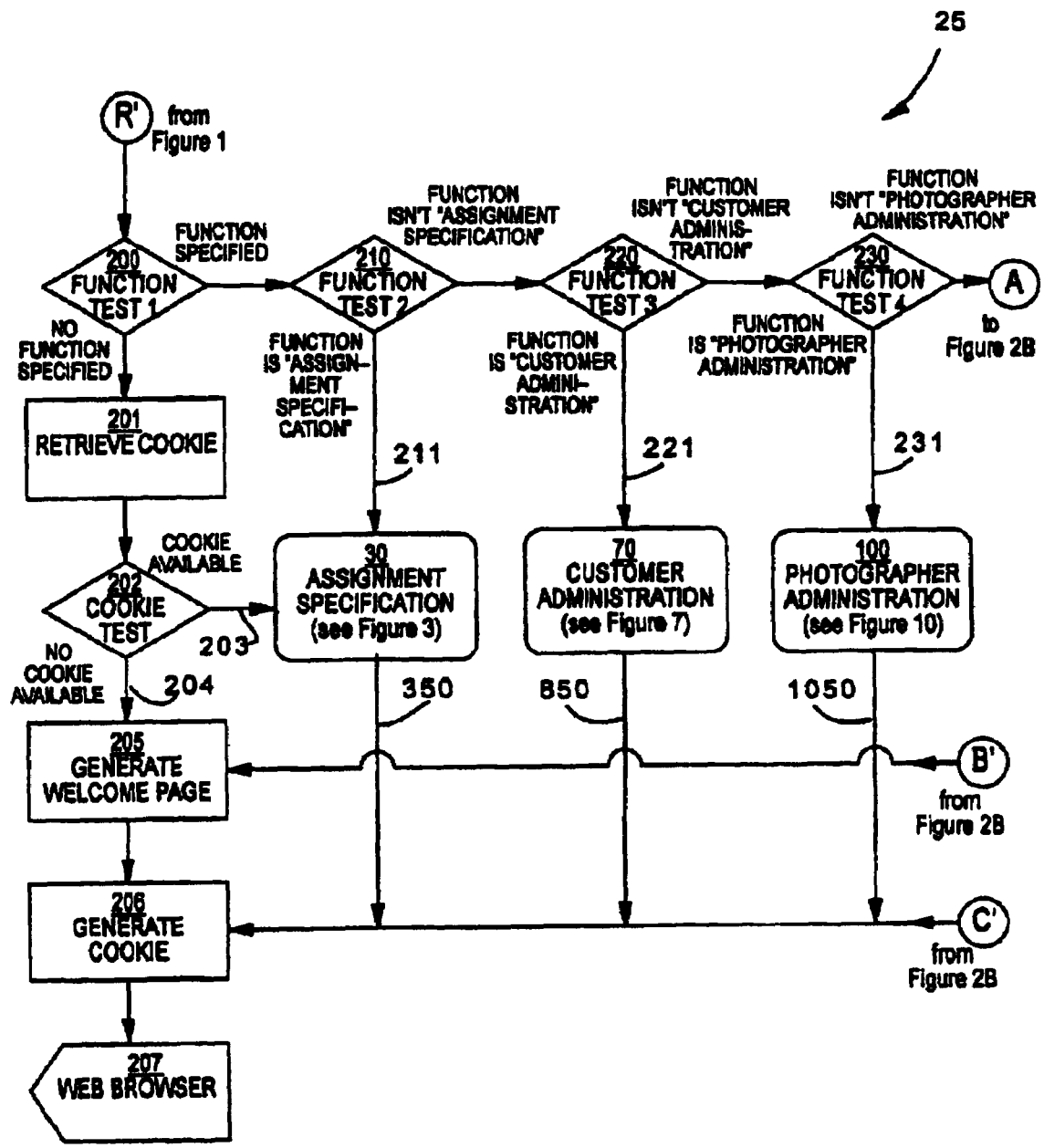
FIG. 2A is a continuation of the flow diagram of the invention shown in FIG. 1

Connector reference R follows function block 115 in FIG. 1, and denotes the continuation of the control program 25 to connector R' in FIG. 2A. In FIG. 2A, a Function Test 1 decision block 200 proceeds from connector reference R'. The decision block 200 is the first of a series of tests to determine which function the control program 25 will perform, employing the FUNCTION_CODE retrieved in function block 115. If no function was specified, the program proceeds to a Retrieve Cookie function block 201; otherwise, the program proceeds to a Function Test 2 decision block 210 with the specified function.

The function block 201 executes when no function was specified, indicating the user caused the control program 25 to be executed by clicking on a hyperlink appearing in HTML, which was not generated by the execution of the control program 25. This will occur, for example, when the user follows a hyperlink appearing in a list of hyperlinks created by a search engine, by selecting from a list of hyperlinks in a bookmark list, or by providing the uniform resource locator (URL) of the control program directly to the web browser. This step retrieves from memory the value of the cookie retrieved in function block 101A and stored in function block 102, shown in FIG. 1.

Figure 17:
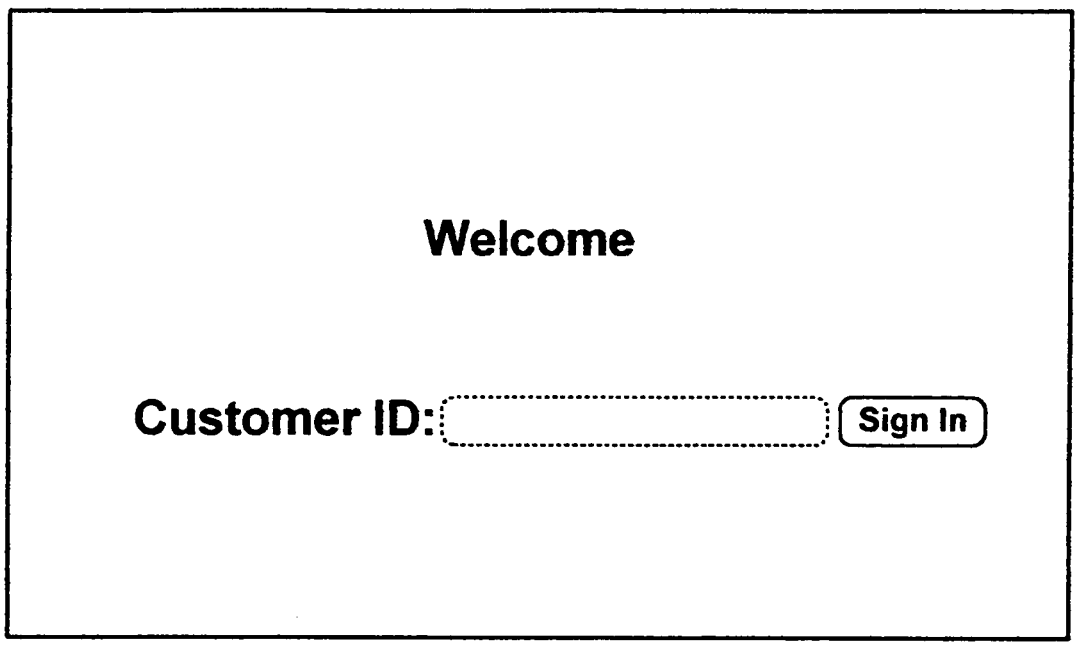
FIG. 17 is a representative user interface display of the "welcome and sign in" step of the invention.

The decision block 202 tests whether the cookie for the current user is available. A cookie may not be available if the user has never placed an order or registered, has configured their browser not to accept cookies, has configured their browser to conditionally accept cookies and has refused to accept the cookie generated by the control program 25, or first accepted a control program 25 generated cookie and subsequently removed it or refused access to it. If no cookie is present, the program proceeds to a Generate Welcome Page function block 205; otherwise, the control program proceeds via a Cookie Available path 203 to an Assignment Specification subprogram 30, which is detailed in FIG. 3. The function block 205 provides for the generation of a standard "welcome and sign-in" HTML when no FUNCTION_CODE and no cookie are available. FIG. 17 is a representative user interface display of the "welcome and sign in" step of the invention.

Following the Generate Welcome Page function Block 205, a Generate Cookie function block 206 is performed. The function block 206 employs the USER_IDENTIFIER stored in the function block 102 or 106 to generate a cookie containing the USER_IDENTIFIER for use by subsequent invocations of the control program 25. In a Web Browser function block 207, the HTML page and the cookie generated in the function block 206 are then routed to a web browser, in this case the Client's Web Browser 1616, as shown in FIG. 16. The purpose of the function block 207 is to show the users, in this case the client, the results of their actions that resulted in invocation of the control program 25. A web browser can be used to prompt for further input for the next step in the process, and to provide "hidden" parameters needed by the control program 25, which are employed in subsequent steps of the process.

A Function Test 2 decision block 210, which performs a second function test, is executed after the first function test of decision block 200 if the FUNCTION_CODE retrieved in the function block 115 was specified. The FUNCTION_CODE is tested to see if it specifies that a new assignment is to begin. If so, an Assignment Specification path 211 is followed to Assignment Specification subprogram 30, which is a component of the control program 25 and is detailed in FIG. 3. Otherwise, the control program 25 proceeds to a Function Test 3 decision block 220, which performs a third function test.

Figure 2B:
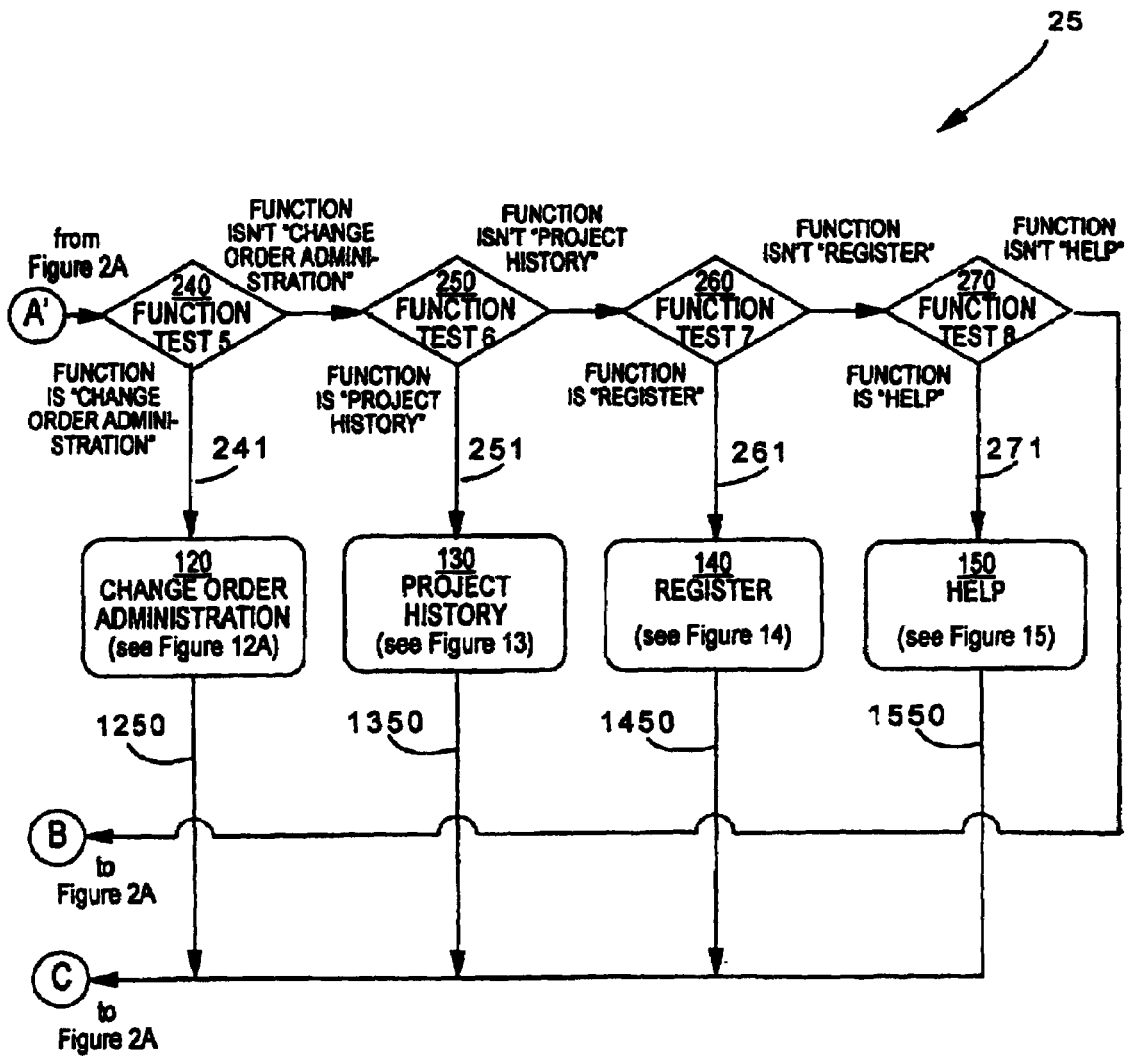
FIG. 2B is a continuation of the flow diagram of the invention shown in FIG. 2A.

In the Function Test 3 decision block 220, a third function test queries if the FUNCTION_CODE specifies customer administration. If the FUNCTION_CODE is "Customer Administration," the control program proceeds on a Customer Administration path 221 to a Customer Administration subprogram 70, which is detailed in FIG. 7. Otherwise, the control program 25 proceeds to a Function Test 4 decision block 230, which performs a fourth function test. Decision block 230 queries whether the FUNCTION_CODE specifies photographer administration. If the function code is "Photographer Administration," the control program proceeds on the Photographer Administration path 231 to a Photographer Administration subprogram 100, which is detailed in FIG. 10. Otherwise the control program proceeds to a Function Test 5 decision block 240, as shown in FIG. 2B, connected by way of connector reference A in FIG. 2A, which continues to connector A' in FIG. 2B.

The decision block 240 is a fifth function test that queries if the FUNCTION_CODE is change order administration. If the FUNCTION_CODE is "Change Order Administration," the control program 25 proceeds on a Change Order Administration path 241 to a Change Order Administration subprogram 120, which is a component detailed in FIG. 12A. Otherwise, the control program 25 proceeds to a Function Test 6 decision block 250.

The decision block 250 is a sixth function test that queries if the FUNCTION_CODE specifies project history. If the FUNCTION_CODE is "Project History," the control program 25 proceeds on a Project History path 251 to a Project History subprogram 130, which is a component detailed in FIG. 13. Otherwise, the control program 25 proceeds to a Function Test 7 decision block 260.

In the decision block 260, a seventh function test is performed to query if the FUNCTION_CODE specifies registration. If the FUNCTION_CODE is "Register," the control program proceeds on a Register path 261 to a Register subprogram 140, which is a component detailed in FIG. 14. Otherwise, the control program 25 proceeds to a Function Test 8 decision block 270.

The decision block 270 is an eighth function test of the FUNCTION_CODE that queries whether the FUNCTION_CODE specifies help. If the FUNCTION_CODE is "Help," the control program 25 proceeds on a Help path 271 to a Help subprogram 150, which is a component detailed in FIG. 15. Otherwise, the control program 25 proceeds via connector B to connector B' in FIG. 2A, and then to the Generate Welcome Page function block 205.

Figure 3:
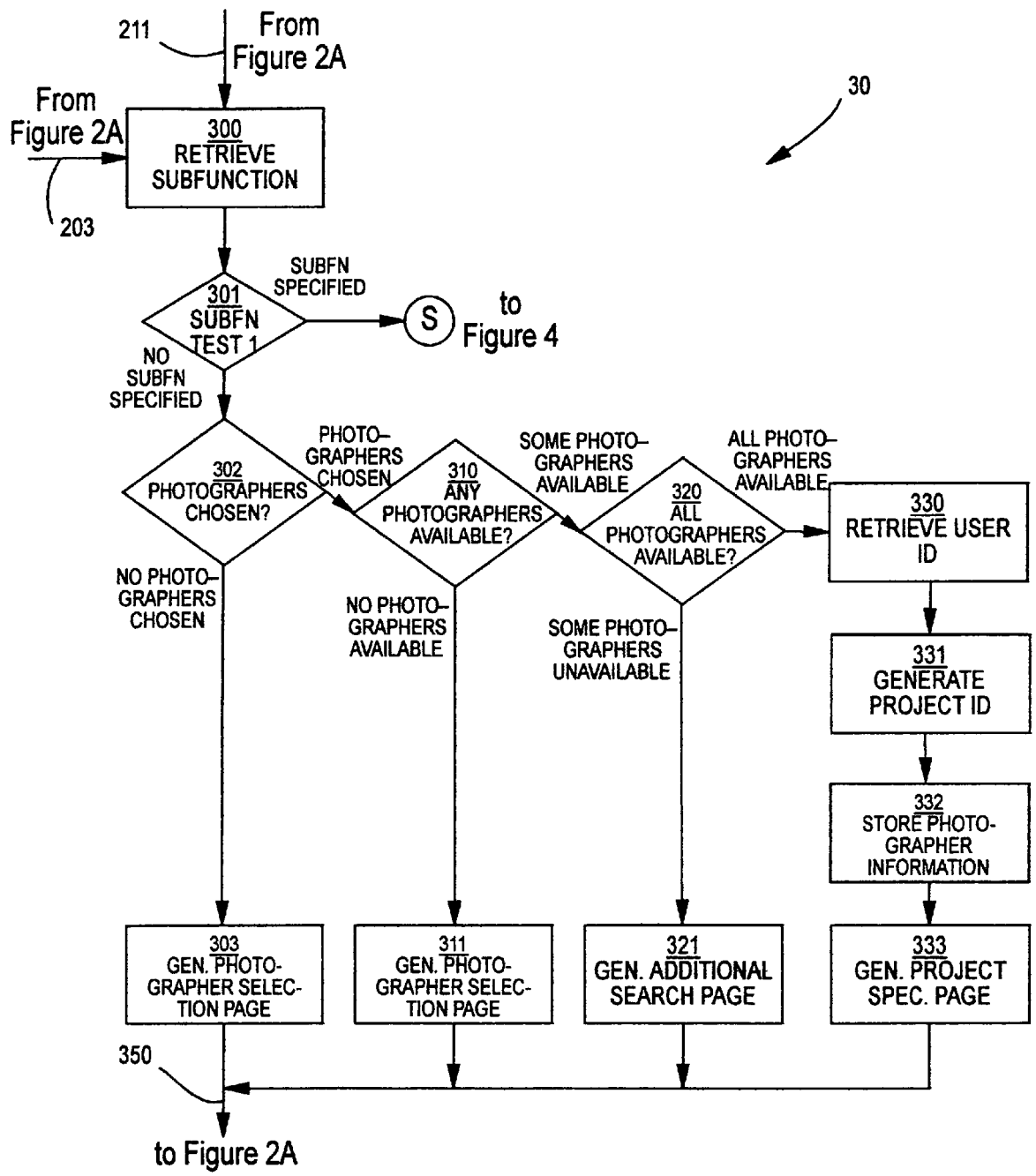
FIG. 3 is a flow diagram of the Assignment Specification subprogram shown in FIG. 2A.

FIG. 3 details the Assignment Specification subprogram 30. First, a Retrieve Subfunction function block 300 is performed. The function block 300 is reached by either the Assignment Specification path 211 or by the Cookie Available path 203, both of which originate in FIG. 2A. In the Retrieve Subfunction function block 300, the SUBFUNCTION_CODE, which was determined by the CGI parameters stored in the Store Variables function block 102, is retrieved from memory. The SUBFUNCTION_CODE determines which of several possible subfunctions the subprogram 30 will perform, based upon the state of the SUBFUNCTON_CODE.

Figure 4:
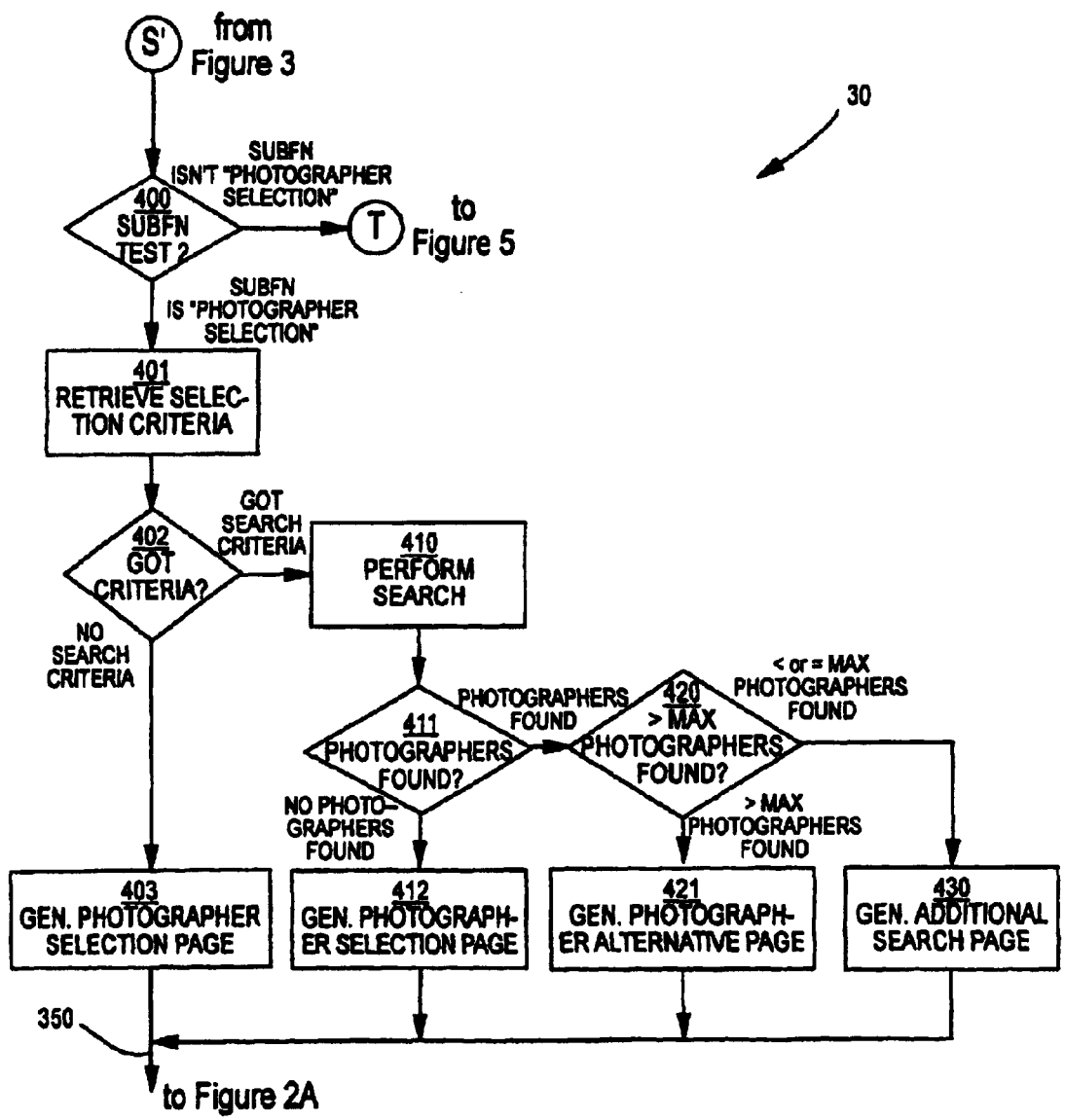
FIG. 4 is a continuation of the flow diagram shown in FIG. 3.

Next, a Subfunction Test 1 decision block 301 performs a first subfunction test to determine which subfunction the Assignment Specification subprogram 30 will perform. The decision block 301 also utilizes the SUBFUNCTION_CODE retrieved in the Retrieve Subfunction block 300. If no subfunction was specified, the control subprogram 30 proceeds to an Image Chosen decision block 302. Otherwise, the subprogram 30 proceeds to a decision block 400, as shown in FIG. 4, by following a connector S to a connector S' in FIG. 4.

The Photographers Chosen decision block 302 tests if the query parameters stored in the Store Variables function block 102 specify one or more photographers. If not, the Assignment Specification 30 subprogram continues to a Generate Photographer Selection Page function block 303. If one or more photographers have been chosen, the program proceeds to an Any Photographers Available decision block 310. The Generate Photographer Selection Page function block 303 generates an HTML page that allows the user to specify criteria for choosing one or more photographers. This HTML page will include CGI parameters specifying a function of "Assignment Specification" and a subfunction of "Photographer Selection."

Figure 18:
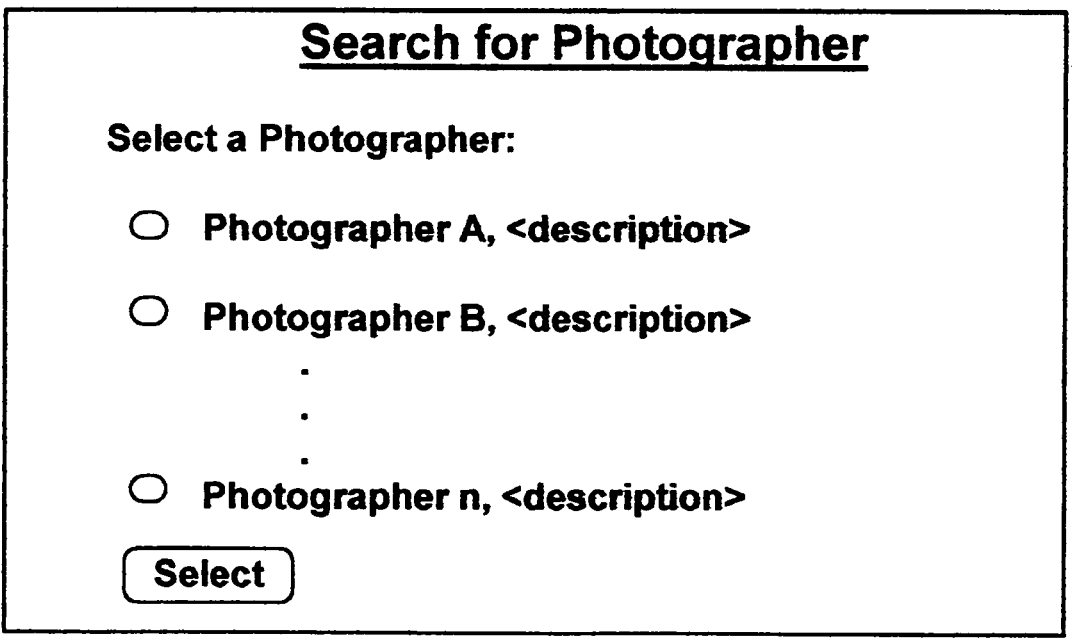
FIG. 18 is a representative user interface display of the "select photographer" step of the invention.

FIG. 18 is a representative user interface display of the "select photographer" step. The preferred implementation of the present invention employs "hidden" parameters to specify the function and subfunction, although alternative implementations may specify the query parameters in the URL referencing the control program 25. After generating the Photographer Selection HTML page, the Assignment Specification subprogram 30 proceeds on path 350 back to the Generate Cookie function block 206 in FIG. 2A.

The Any Photographers Available decision block 310 is reached when one or more photographers have been chosen. This decision block checks if any of the selected photographers are available. If none of the photographers are available, the Assignment Specification subprogram 30 continues to a Generate Photographer Selection Page function block 311. If one or more of the selected photographers are available, the subprogram proceeds to an All Photographers Available decision block 320. The Generate Photographer Selection Page function block 311 generates an HTML page that allows the user to specify criteria for choosing one or more photographers and including an error message indicating that none of the photographers previously selected are available at this time. This HTML page will include CGI parameters specifying a function of "Assignment Specification" and a subfunction of "Photographer Selection."

The All Photographers Available decision block 320 is reached when one or more photographers have been chosen and one or more of the chosen photographers are available. This decision block checks if all of the selected photographers are available. If some of the photographers are not available, the Assignment Specification subprogram 30 continues to a Generate Additional Search Page function block 321. If all the selected photographers are available, the subprogram proceeds to a Retrieve User ID function block 330. The subprogram may be configured to perform this test contemporaneously with the test performed in the decision block 310 or to use information generated during the performance of the decision block 310.

The Generate Additional Search Page function block 321 generates an HTML page indicating one or more of the chosen photographers are unavailable and which of the photographers are available. The page further allows the user to specify criteria for choosing one or more additional photographers, or to specify she wishes to continue with the assignment process using only those photographers currently available. This HTML page will be arranged in such a way (such an arrangement is well known and easily accomplished by any technician versed in the art of web page programming) that if the user chooses to continue with only those photographers currently available, CGI parameters specifying a function of "Assignment Specification" and no subfunction will be passed to the next execution of the program, and if the user chooses to search for additional photographers, CGI parameters specifying a function of "Assignment Specification" and a subfunction of "Photographer Selection" will be passed to the next execution of the program.

After confirming that one or more photographers have been chosen, and the photographers are available, the Assignment Specification subprogram 30 proceeds to the Retrieve User ID function block 330. In this function block, the customer identifier stored in the Store Variables function block 102 or the Store User ID function block 106, as shown in FIG. 1, is retrieved. From function block 330, the subprogram proceeds to a Generate Project ID function block 331, where a unique PROJECT_IDENTIFIER is generated for this specific transaction.

To generate the PROJECT_IDENTIFIER, the preferred implementation uses information from the environment in which the control program is running. This information can include the current time, the IP address of the user's computer and a counter number. The counter number can be a simple counter appended to a Cyclic Redundancy Check (CRC). The generation of a CRC is known to those having skill in such programming tasks. Any method that generates a small, unique text string is considered suitable by the inventors; however, any method available to those versed in the art of generating a unique identifier can be used.

After generating the PROJECT_IDENTIFIER, and by employing the USER_IDENTIFIER retrieved in function block 330, a Store Photographer Information function block 332 stores the photographers chosen. The preferred implementation uses a "Structured Query Language" (SQL) compliant relational database to store this and other persistent information, although any persistent storage method is acceptable and is included in the scope of the invention.

From the function block 332, the Assignment Specification subprogram 30 proceeds to a Generate Project Specification Page function block 333. The function block 333 generates an HTML page that allows the user to provide information about the project. This HTML page will include CGI parameters specifying a function of "Assignment Specification" and a subfunction of "Project Specification." After generating the project specification HTML page, the subprogram proceeds on path 350, to the Generate Cookie function block 206 in FIG. 2A.

The connector S in FIG. 3 continues to the connector S' in FIG. 4 and proceeds in FIG. 4 to a Subfunction Test 2 decision block 400. The decision block 400 performs the second in a series of tests to determine which subfunction the control program will perform. Decision block 400 employs the subfunction code retrieved in the function block 300. The decision block 400 tests if the subfunction is "Photographer Selection." If so, the Assignment Specification subprogram 30 proceeds to a Retrieve Selection Criteria function block 401. If the result of the Subfunction decision block 400 test is not Photographer Selection, the subprogram 30 proceeds to connector T, which continues to connector T' in FIG. 5.

The Retrieve Selection Criteria function block 401 retrieves the selection criteria entered by the user and included in the CGI parameters, which were first retrieved in the Parameters function block 101A and stored in the Store Variables function block 102 shown in FIG. 1. The Function block 401 is followed by a Got Criteria decision block 402 that tests to see if any selection search criteria were retrieved in function block 401. The absence of search criteria indicates that the user submitted the photographer selection page without specifying any criteria, and so the Assignment Specification subprogram 30 then proceeds to a Generate Photographer Selection Page function block 403. Otherwise, the subprogram proceeds to a Perform Search function block 410.

The Generate Photographer Selection Page function block 403 generates an HTML page allowing the user to specify criteria for choosing one or more photographers and including an error message indicating that some criteria must be specified. This HTML page will include CGI parameters specifying a function of "Assignment Specification" and a subfunction of "Photographer Selection." After generating the HTML page the subprogram proceeds on path 350, to the Generate Cookie function block 206 in FIG. 2A.

The Perform Search function block 410 employs the criteria retrieved in function block 401 to perform a search for photographers matching the user selected criteria. The preferred implementation of the present invention will submit a "select" statement to the SQL-compliant relational database used to store information about photographers. The construction of the select statement is a standard database function, familiar to anyone versed in the art of database execution. Alternative implementations that are included in the scope of the invention may use other persistent storage methods. This search function block 410 preferably uses a method appropriate to the type of persistent storage method employed.

A Photographers Found decision block 411 is then performed on the results from the Perform Search function block 410. The decision block 411 tests if the function block 410 located any photographers matching the criteria specified. If no photographers were found, the Assignment Specification subprogram 30 continues to a Generate Photographer Selection Page function block 412. If one or more photographers are found, the subprogram proceeds to a >Max Photographers Found decision block 420. The symbol ">" is conventionally used to designate the term "more than," the symbol "<" is used to designate the term "less than," and "=" is used to designate the term "equal to."

The Generate Photographer Selection Page function block 412 generates an HTML page allowing the user to specify criteria for choosing a photographer. This HTML page preferably includes a message indicating the previous search failed to locate any photographers matching the criteria. Additionally, this HTML page will include CGI parameters specifying a function of "Assignment Specification" and a subfunction of "Photographer Selection." After generating the HTML page in function block 412, the Assignment Specification subprogram 30 proceeds on path 350 to the Generate Cookie function block 206, in FIG. 2A.

The >Max Photographers Found decision block 420 is reached when one or more photographers were found by the Perform Search function block 410. The >Max Photographers Found decision block tests whether more than the maximum number of photographers to whom an assignment project can be submitted for a bid were found. The maximum number of photographers is three in the preferred implementation, but may be configured lower or higher, including effectively infinite. If more than the maximum allowable number of photographers was found, the Assignment Specification subprogram 30 continues to a Generate Photographer Alternative Page function block 421, otherwise it continues to a Generate Additional Search Page function block 430. The Generate Photographer Alternative Page function block 421 generates an HTML page listing the photographers located in the Perform Search function block 410. The HTML generated by Function block 421 also allows the user to choose up to the maximum allowable number of photographers from those found by the Perform Search function block 410. This HTML page will include CGI parameters specifying a function of "Assignment Specification," but no subfunction. After generating the HTML page in function block 421 the Assignment Specification subprogram 30 proceeds on path 350, to the Generate Cookie function block 206 in FIG. 2A. The Generate Additional Search Page function block 430 generates an HTML page indicating which photographers were found by the Perform Search function block 410. The page further allows the user to specify criteria for choosing one or more additional photographers, or to specify she wishes to continue with the assignment process using only those photographers found. This HTML page will be arranged in such a way (such an arrangement is well known and easily accomplished by any technician versed in the art of web page programming) that if the user chooses to continue with only those photographers found, CGI parameters specifying a function of "Assignment Specification" and no subfunction will be passed to the next execution of the program, and if the user chooses to search for additional photographers, CGI parameters specifying a function of "Assignment Specification" and a subfunction of "Photographer Selection" will be passed to the next execution of the program. FIG. 18 is a representative user interface display of the "select photographer" step. The preferred implementation of the present invention employs "hidden" parameters to specify the function and subfunction, although alternative implementations may specify the query parameters in the URL referencing the control program 25. After generating the Additional Search HTML page, the Assignment Specification subprogram 30 proceeds on path 350 back to the Generate Cookie function block 206 in FIG. 2A.

Figure 5:
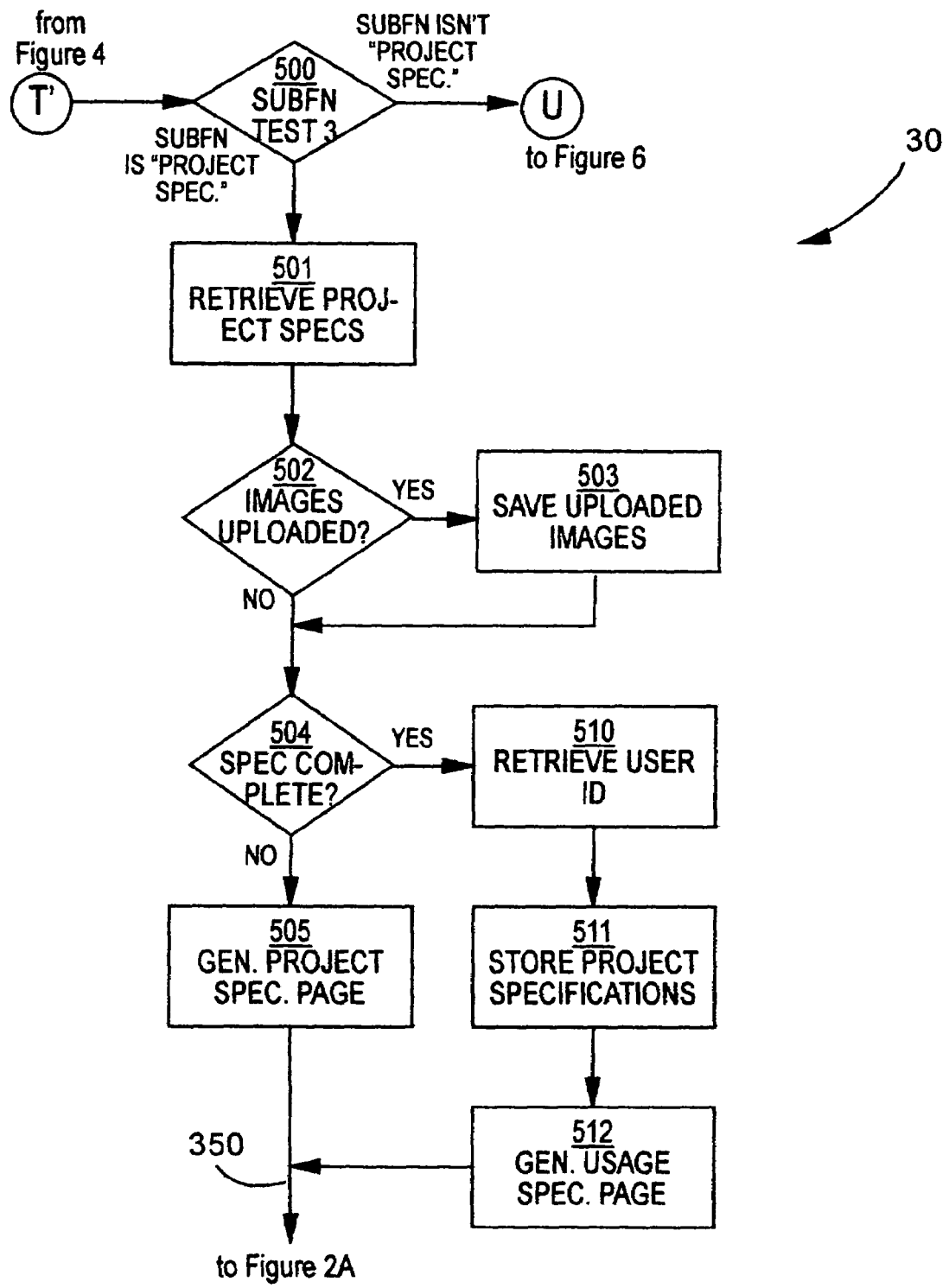
FIG. 5 is a continuation of the flow diagram shown in FIG. 4.

If the result of the Subfunction Test 2 decision block 400 test is not "Photographer Selection," the Assignment Specification subprogram 30 proceeds from connector T in FIG. 4 to connector T' in FIG. 5. In FIG. 5 the subprogram proceeds to Subfunction decision block 500. Decision block 500 is the third in a series of subfunction tests to determine which subfunction the control subprogram will perform, using the subfunction code retrieved in the Retrieve Subfunction block 300 in FIG. 3. The decision block 500 tests if the subfunction is "Project Specification." If so, the subprogram continues to Retrieve Project Specifications function block 501. Otherwise, the subprogram 30 proceeds to a connector U, which continues to a connector U' in FIG. 6 and a Subfunction Test 4 decision block 600.

The Retrieve Project Specifications function block 501 retrieves the project specifications entered by the user and included in the CGI parameters, which were first retrieved in the Parameters function block 101A and stored in the Store Variables function block 102 shown in FIG. 1. The control program then receives a photographic assignment specification from the user, preferably in the form of a questionnaire or query formulated by the control program based upon input from the user. The specification details the criteria for the photographic assignment, such as a description of the project either verbally or in a written set of job or project specifications.

These project specification preferably include specifics such as the usage required on the photographs, how many shots, where and when the shots are to be performed, what film format, whether the photographs will include models, and if so what sort and how many. If people, such as extras or models are required, their availability, travel requirements, if any, must also be considered. This information is all used to create an "estimate," which is a cost that generally is not a "fixed bid" but rather a close estimation of the true cost of the photo shoot or project. If there are no changes or surprises this estimate will be what the actual cost is, normally within 5 to 10 percent.

In the on-line photographic assignment process of the present invention, this specification information will all be entered in the form of a questionnaire or query, along with scans of any layout and provided to up to any number of photographers of a client's choice, upon review. The user, once their data on the questionnaire is entered, will receive general pricing information and will receive complete pricing responses from any or all of the selected photographers along with personal calls if desired. The user will be able to request direct contact once the job info is entered, if that user is a registered user whose information is recorded at the site of entry, or if they are a previous user. In cases where the client is out of area the links provided to model agencies in the clients area will enable our online process to easily defer more involvement to the client in model selection thus creating a savings where desired. Otherwise, the photographer may "out-source" the models as requested after checking availability, in which case higher fees will apply for this service and others such as sets, model building, location securement and the like. In traditional assignment once a job commences it is a 100 percent financial obligation. However, clients also often take up to ninety days to pay, leaving photographers with significant cash flow problems. In our online process of the present invention, if the client decides to do the job with one of the photographers, they commit to 50 percent of job cost at commencement, and enter Visa or Master Charge number or provide a purchase order. If the project is "killed" or canceled the client is committed to an additional 25 percent after the Polaroid image stage. Approval of the snap or Polaroid is required prior to the shoot for studio and some location work.

After retrieving the project specifications, The Assignment Specification subprogram 30 then continues to an Images Uploaded decision block 502. Decision function 502 tests if the user uploaded sample images to guide the photographer's work. These images may be scanned or digitally created and may consist of anything the user wishes to show the photographers to assist in planning the project, including, but not limited to, digitally captured, created or rendered images or scans of photographs, illustrations, sketches, colors, textures or fabrics. If images were uploaded the subprogram continues to a Save Uploaded Images function block 503. If no images were uploaded, the subprogram 30 skips to a Specification Complete decision block 504.

If the Assignment Specification subprogram 30 reaches the Save Uploaded Photographs function block 503, the user has uploaded one or more sample photographs. The function block 503 retrieves the sample photographs from the CGI environment, which is a standard function known to anyone versed in the programming art, and stores them. The preferred implementation of the present invention stores the photographs in the file system of the server hosting the control subprogram 30, and saves the name of the files used in an SQL-compliant relational database. However, alternative methods of storing the photographs can be employed in the present invention.

The Specification Complete decision block 504 tests if the project specification retrieved in decision block 501 is complete. If not, the Assignment Specification subprogram 30 continues with a Generate Project Specification Page function block 505. Otherwise, the project specification is considered complete and the subprogram 30 continues to a Retrieve User Identification function block 510.

In the Generate Specification Page function block 505, an HTML page is generated that allows the user to provide information about the project. An error message indicating the prior project specification was incomplete is generated also. This HTML page will include CGI parameters specifying a function of "Assignment Specification" and a subfunction of "Project Specification." After generating the HTML page in the function block 505 the Assignment Specification subprogram 30 proceeds on path 350, to the Generate Cookie function block 206 in FIG. 2A.

In the Retrieve User Identification function block 510, the subprogram 30 retrieves the USER_IDENTIFIER stored in the Store Variables function block 102 or function block 106, as shown in FIG. 1. A Store Project Specifications function block 511 follows the function block 510. Function block 511 employs the USER_IDENTIFIER retrieved in function block 510, to store the accompanying project specification. The preferred implementation again uses an SQL-compliant relational database to store this and other pertinent information, although any persistent storage method is acceptable and is considered by the inventors as included in the scope of the invention.

A Generate Usage Specification Page function block 512 follows function block 511. Function block 512 generates an HTML page that allows the user to specify usage information. This HTML page will include CGI parameters specifying a function of "Assignment Specification" and a subfunction of "Usage Specification." After generating the HTML page, the Assignment Specification subprogram 30 also proceeds on path 350, to the Generate Cookie function block 206 in FIG. 2A.

Figure 6:
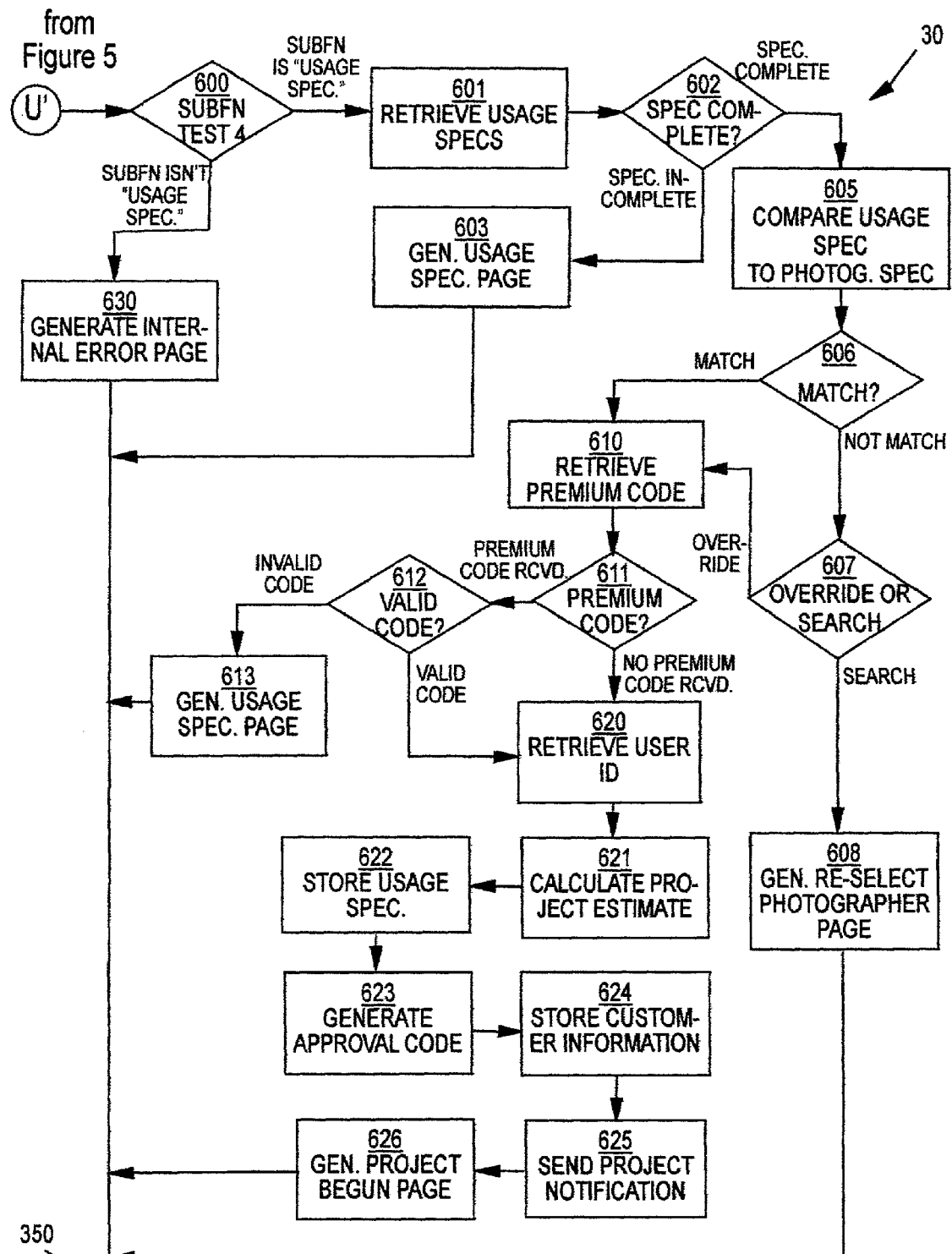
FIG. 6 is a continuation of the flow diagram shown in FIG. 5.

The connector U from FIG. 5 continues to connector U' and a Subfunction Test 4 decision block 600 in FIG. 6. The decision block 600 performs the fourth in a series of tests to determine which subfunction the Assignment Specification subprogram 30 will perform. Decision block 600 tests if the SUBFUNCTION_CODE retrieved in the function block 300 in FIG. 3 is "Usage Specification." If the subfunction is "Usage Specification," subprogram 30 continues to a Retrieve Usage Specifications function block 601. If the subfunction is not "Usage Specification," the SUBFUNCTION_CODE is erroneous, since all other possible subfunction codes have been tested for. With this error, the subprogram 30 proceeds with a Generate Internal Error Page function block 630.

The Retrieve Usage Specifications function block 601 retrieves the usage specification entered by the user and included in the CGI parameters, which were first retrieved in the Parameters function block 101A and stored in the Store Variables function block 102, as shown in FIG. 1. The function block 601 is followed by a Specification Complete decision block 602. The decision block 602 tests if the usage specification retrieved in function block 601 is complete. If the usage specification is complete, the subprogram 30 goes to a Compare Usage Specification to Photographer Specification function block 605. If the usage specification is not complete, the Assignment Specification subprogram 30 continues to a Generate Usage Specification Page function block 603.

The Generate Usage Specification Page function block 603 generates an HTML page allowing the user to specify usage information and including an error message indicating the prior usage specification was incomplete. This HTML page will include CGI parameters specifying a function of "Assignment Specification" and a subfunction of "Usage Specification." After generating the HTML page in function block 603, the Assignment Specification subprogram 30 proceeds on path 350 to the Generate Cookie function block 206 in FIG. 2A.

The Compare Usage Specification to Photographer Specification function block 605 compares the usage specification retrieved in the Retrieve Usage Specifications function block 601 and compares them to a set of photographer's specifications, as on file in a Photographer Date Base 1608, shown schematically in FIG. 16. The photographer's specifications include the preferences and expertise of the photographer, regarding the scope of the photographer's work experience and abilities that are specifically considered acceptable to the photographer. If the usage specifications match the photographer's specifications, the Assignment Specification subprogram 30 goes to a Retrieve Premium Code function block 610. Otherwise, the usage specifications do not match the photographer's specifications and the subprogram 30 goes to an Override or Search decision box 607.

The Override or Search decision box 607 provides the user with the ability to continue with the project specification and assignment regardless of the photographer's specification. This may be desirable in unique projects that are not typical for any one photographer or that are narrowly outside the specifications of a desired photographer. If the comparison made in function block 605 is overridden, the subprogram 30 proceeds to a Retrieve Premium Code function block 610. Otherwise, the subprogram proceeds to a Generate Re-Select Photographer Page function block 608 to alert the user that the user must perform another photographer search to find an appropriate photographer with specifications that are closer to the user's needs. After generating the HTML page in function block 608, the Assignment Specification subprogram 30 proceeds on path 350 to the Generate Cookie function block 206, in FIG. 2A.

Figure 14:
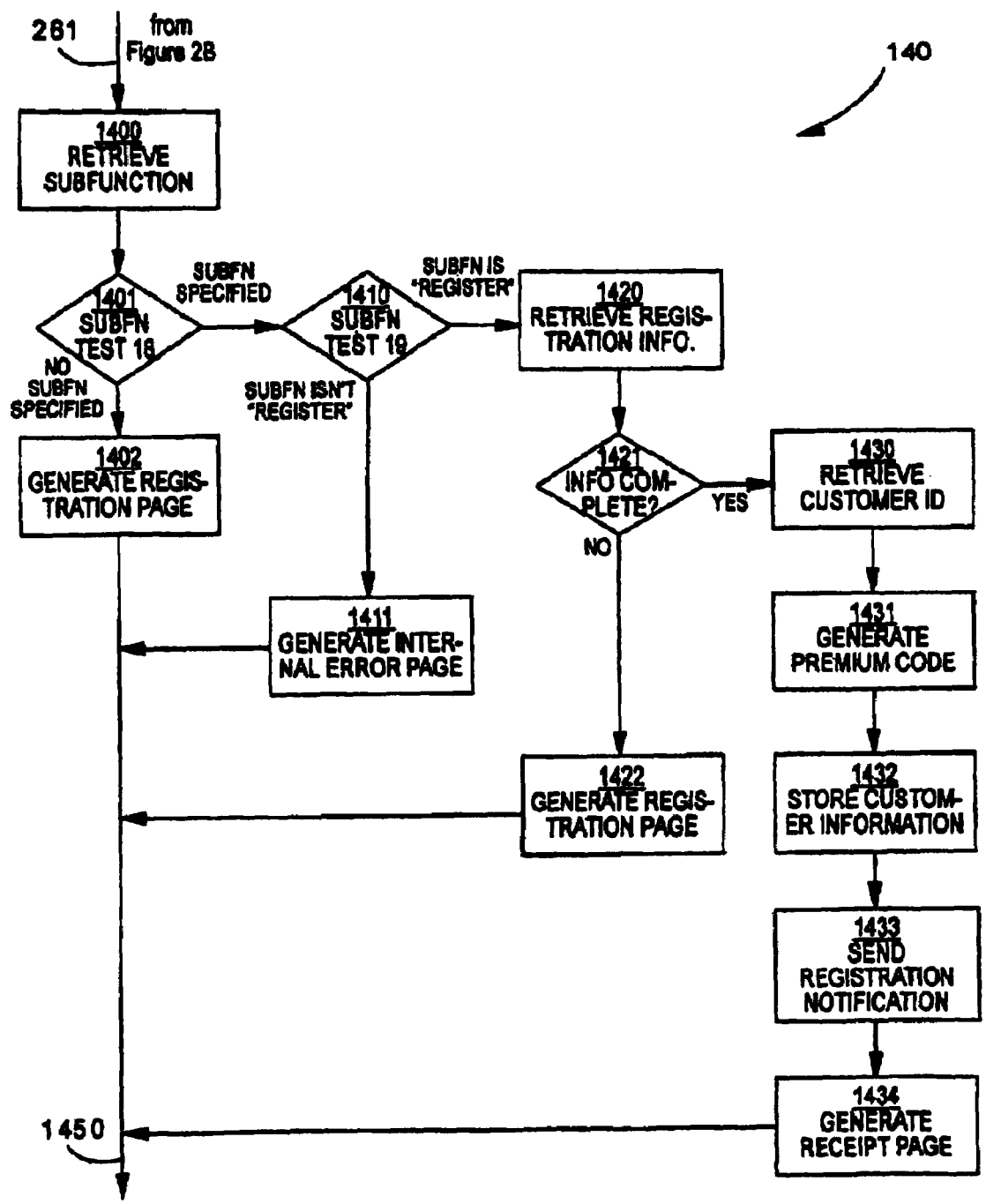
FIG. 14 is a flow diagram of the Register subprogram shown in FIG. 2B.

The Retrieve Premium Code function block 610 retrieves the premium code entered by the user (if any) and included in the CGI parameters, which were first retrieved in the Parameters function block 101A and stored in the Store Variables function block 102, as shown in FIG. 1. The premium code is generated in function block 1431, as shown in FIG. 14, when a customer registers.

From the Retrieve Premium Code function block 610, the Assignment Specification a subprogram 30 continues to a Premium Code decision block 611, which tests if a premium code was received. If a premium code was received, the subprogram 30 continues with a Valid Code decision block 612. Otherwise, having no premium code, the subprogram goes to a Retrieve User Identifier function block 620. If the premium code retrieved in function block 610 was received from the user, the Valid Code decision block 612 tests if the premium code received is valid and has not already been used. If the premium code is valid and has not been previously used, subprogram 30 proceeds to a Retrieve User Identifier function block 620. If the premium code is not valid or has been used, subprogram 30 continues to a Generate Usage Specification Page function block 613.

The Generate Usage Specification Page function block 613 generates an HTML page allowing the user to specify usage information and including an error message indicating the premium code entered was invalid or already used. This HTML page will include CGI parameters specifying a function of "Assignment Specification" and a subfunction of "Usage Specification." After generating the HTML page in function block 613, the Assignment Specification subprogram 30 proceeds on path 350 to the Generate Cookie function block 206, in FIG. 2A.

In the Retrieve User Identification function block 620, the subprogram 30 retrieves the USER_IDENTIFIER stored in the function block 102 or the function block 106, as shown in FIG. 1. At the function block 620, the user has entered a complete usage specification for the photography assignment. A Calculate Project Estimate function block 621 follows the function block 620. Based upon the usage specification retrieved in the function block 601 and the premium code retrieved in the function block 610 (if any), function block 621 calculates an estimated project cost. The preferred implementation of the present invention uses an externally stored multidimensional matrix to calculate the project cost. A standard, commercially available matrix method package is preferably employed, although alternative implementations are certainly practicable. Following function block 621, a Store Usage Specification function block 622 employs the customer identifier retrieved in function block 620, to store the accompanying project cost calculated in function block 621 and the related usage specification. The preferred implementation again uses an SQL-compliant relational database to store this and other pertinent information, although any persistent storage method is acceptable.

From function block 622, the Assignment Specification subprogram 30 continues to a Generate Approval Code function block 623. Function block 623 generates the approval code used to approve stages in the assignment process. The preferred implementation of the present invention employs a simple counter to generate the approval code, although any method that generates a small and unique text string is considered a suitable alternative. The Assignment Specification subprogram 30 continues from function block 623 to a Store Customer Information function block 624. The function block 624 stores the approval code generated in function block 623 and the customer identifier, relating it to the user identification. The preferred implementation again employs an SQL-compliant relational database to store this information, although any persistent storage method is acceptable and considered as an alternative by the present inventors.

From function block 624 the subprogram 30 proceeds to a Send Project Notification function block 625. The function block 625 sends a notification of the project to the photographer or photographers chosen as alternatives by the customer for the project. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art. A Generate Project Begun Page function block 626 follows function block 625. Function block 626 generates an HTML page informing the user of the approval code generated in function block 623 and that the photographer or photographers chosen have been notified. This HTML page will not include CGI parameters specifying a function or subfunction. However, it will preferably include a link (the construction of which is familiar to anyone versed in the art of web page construction) to the customer administration page allowing the customer immediate access to information on the current or other projects. After generating the HTML page, the Assignment Specification subprogram 30 proceeds on path 350 to the Generate Cookie function block 206 in FIG. 2A.

The Generate Internal Error Page function block 630 occurs when an unlisted subfunction is retrieved. As the subfunctions are generated internally, this shouldn't occur unless an internal error has occurred. This function block generates an HTML page indicating that this error has occurred and then the subprogram 30 proceeds on path 350 to the Generate Cookie function block 206 in FIG. 2A.

Figure 7:
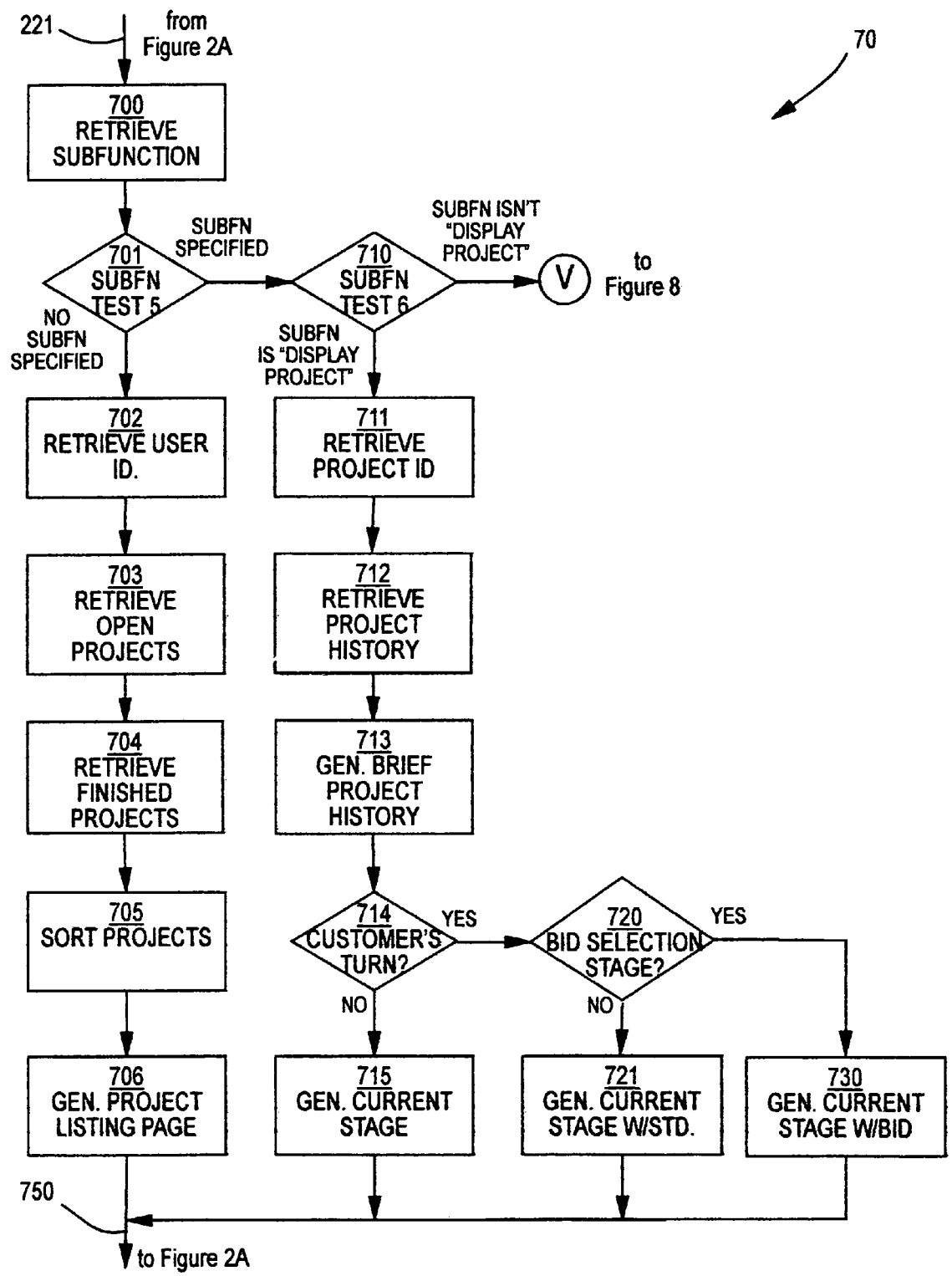
FIG. 7 is a flow diagram of the Customer Administration subprogram shown in FIG. 2A.

The Customer Administration subprogram 70 is schematically detailed in FIGS. 7, 8, 9A and 9B. In FIG. 7, a Retrieve Subfunction function block 700 continues on path 221 from the decision block 220 when the function is "Customer Administration," as shown in FIG. 2A. Function block 700 retrieves from memory the SUBFUNCTION_CODE determined by the CGI parameters stored in the Store Variables function block 102. The SUBFUNCTION_CODE determines which of several possible subfunctions the control program will perform.

The Customer Administration subprogram 70 continues from function block 700 to a Subfunction Test 5 decision block 701. Decision block 701 is the fifth of the series of tests to determine which subfunction the control program 25 will perform, using the SUBFUNCTION_CODE retrieved in function block 700. If no function was specified, the subprogram 70 proceeds to Retrieve User Identification function block 702. Otherwise, the subprogram 70 continues to a Subfunction Test 6 decision block 710.

In the Retrieve User Identification function block 702, the USER_IDENTIFIER stored in the function block 102 or function block 106, as shown in FIG. 1, is retrieved. In the function block 702, the user identifier is used to identify a customer. From function block 702 the Customer Administration subprogram 70 continues to a Retrieve Open Projects function block 703. In function block 703 all pertinent information is retrieved on any "open" or in-progress projects having an associated USER_IDENTIFIER equal to the USER_IDENTIFIER retrieved in function block 702. In the preferred implementation, this function is achieved by constructing an SQL "select" statement, a procedure known to those versed in the art. The subprogram 70 passes the select statement to the SQL-compliant relational database used to store persistent information. In alternative implementations of the present invention, other persistent storage methodologies could be employed, along with the appropriate procedure to retrieve data under those storage methodologies.

From the Retrieve Open Projects function block 703, the Customer Administration subprogram 70 proceeds to a Retrieve Finished Projects function block 704. Function block 704 retrieves information on all finished projects having an associated customer identifier equal to the user identifier retrieved in the Retrieve User Identification function block 702. As in function block 703, a procedure appropriate to the persistent storage methodology in use is preferably employed. After the function block 704, the subprogram 70 continues to a Sort Projects function block 705. The function block 705 sorts the projects retrieved in the function block 703 and in the function block 704.

In the preferred implementation of the present invention, the Sort Projects function block 705 performs a first sort of those open projects that still need input from the customer. The function block 705 follows the first sort of open projects by performing a second sort of open projects awaiting photographer input. Finally, the function block 705 performs a third sort of finished projects. Alternative implementations may sort the projects in a different, preselected manner, or may allow the user to specify a more preferential sort order.

After the Sort Projects function block 705, the Customer Administration subprogram 70 proceeds to a Generate Project Listing Page function block 706. The function block 706 generates an HTML page presenting the projects sorted in the function block 705. In the preferred implementation of the present invention, the display of each open project is constructed in such a way that a selection of a particular project executes the control program 25 for that project. This function block 706 can be constructed to perform this routine by any technician versed in the art of such programming.

Additionally, it is preferred to specify "hidden" parameters with the project's unique PROJECT_IDENTIFIER, a function of "Customer Administration," and a subfunction of "Display Project." The display of finished projects is constructed so that selecting the project runs the control program 25, specifying in "hidden" parameters the PROJECT_IDENTIFIER of the project, a function of "Project History," and a subfunction of "Display Project."

The page generated by the function block 706 also includes an entry field and a "submit" button. The entry field and submit button are HTML elements readily constructed by anyone skilled in the art of web page construction. This generated page allows the user to enter the PROJECT_IDENTIFIER of a project to be displayed. After generating the HTML page, the Customer Administration subprogram 70 proceeds on path 750 to the Generate Cookie function block 206 in FIG. 2A.

From the Subfunction Test 6 decision block 701, where the subfunction was specified, the subprogram 70 proceeds to the Subfunction Test 6 decision block 710. The decision block 710 is the sixth in the series of tests to determine which subfunction the control program will execute. The decision block 710 employs the SUBFUNCTION_CODE retrieved in the Retrieve Subfunction function block 700. If the subfunction is "Display Project," the subprogram 70 continues to a Retrieve Project Identifier function block 711. If the subfunction is not "Display Project," the subprogram 70 goes to a continuation V of FIG. 7, which proceeds to a corresponding continuation V' and then to a Subfunction Test 7 decision block 800 in FIG. 8.

In the Retrieve Project Identifier function block 711, the PROJECT_IDENTIFIER is retrieved. The PROJECT_IDENTIFIER is one of the available "hidden" parameters that were stored in the Store Variables function block 102 of FIG. 1. The subprogram 70 then proceeds to the Retrieve Project History function block 712 to retrieve information associated with the selected project having the PROJECT_IDENTIFIER retrieved in function block 711. In the preferred implementation of the present invention, this retrieval is achieved by constructing a simple SQL "select" statement, which is a well-established procedure. The select statement is passed to the SQL-compliant relational database or equivalent system employed to store persistent information.

From the Retrieve Project History function block 712, the Customer Administration subprogram 70 continues to a Generate Brief Project History function block 713. This function block 713 generates HTML to display a brief history of the specific project retrieved in the function block 712. The preferred implementation constructs the display of each revisional stage in the specified project such that selecting the project runs the control program 25. Additionally, as preferred, the function block 713 specifies in "hidden" parameters, a sequential number that is assigned to each revisional stage, the PROJECT_IDENTIFIER, a function of "Project History," and a subfunction of "Display Stage." The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

From the Generate Brief Project History function block 713, the Customer Administration subprogram 70 proceeds to a Customer's Turn decision block 714. The decision block 714 tests if the current stage requires input from the customer. If customer input is not required, the subprogram 70 proceeds to a Generate Current Stage function block 715. If customer input is required, the subprogram 70 proceeds to a Bid Selection Stage decision block 720.

The Generate Current Stage function block 715 employs the HTML generated in the function block 713 to generate an HTML page containing the brief project history. Because the current stage awaits the photographer's input, no input elements are provided for customer comment or approval. After the function block 715 generates the HTML page, the subprogram 70 proceeds on path 750 to the Generate Cookie function block 206 in FIG. 2A. If the current stage requires input from the customer, the subprogram 70 proceeds from the decision block 714 to a Bid Selection Stage decision block 720. The decision block 720 tests if the current stage is the one at which the customer must choose from a number of competing bids submitted by the photographers originally selected for the project. If not, the subprogram 70 proceeds to a Generate Current Stage with Standard Input function block 721. If the current stage is the one at which the customer chooses a bid, the subprogram 70 proceeds to a Generate Current Stage with Bid Input function block 730. The Generate Current Stage with Standard Input function block 721 employs the HTML generated in the function block 713 to generate an HTML page containing the brief project history and input elements allowing the user to make comments about the present, selected revision stage or to approve the present stage. This generated page also contains "hidden" parameters specifying a function of "Customer Administration" and a subfunction of "Customer Input."

After the function block 721 generates the HTML page, the subprogram 70 proceeds on path 750 to the Generate Cookie function block 206 in FIG. 2A. The Generate Current Stage with Bid Input function block 730 employs the HTML generated in the function block 713 to generate an HTML page containing the brief project history and input elements allowing the user to select one of the bids provided by the photographers initially chosen by the customer to take part in the project. This generated page also contains "hidden" parameters specifying a function of "Customer Administration" and a subfunction of "Customer Input." After the function block 730 generates the HTML page, the subprogram 70 proceeds on path 750 to the Generate Cookie function block 206 in FIG. 2A.

Figure 8:
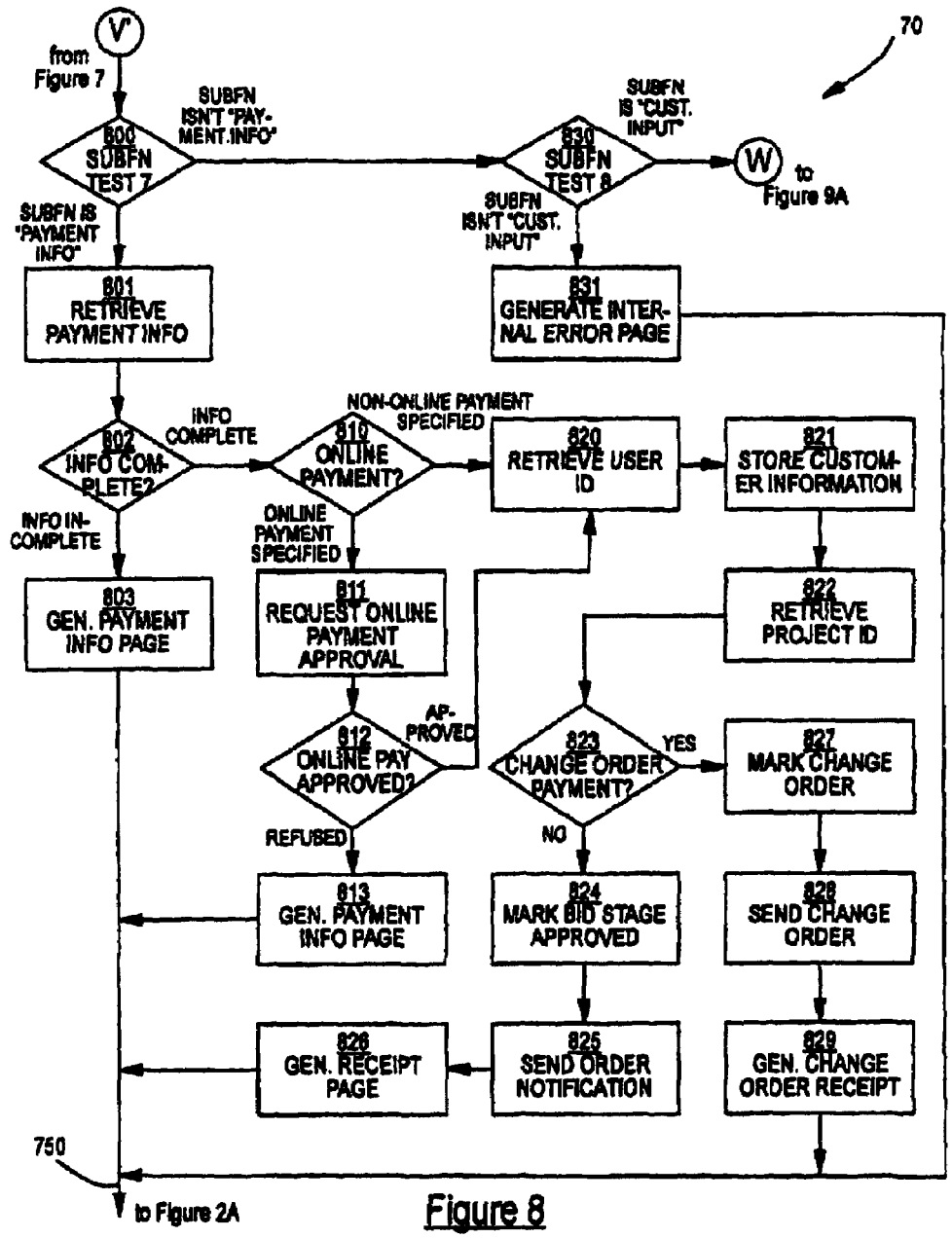
FIG. 8 is a continuation of the flow diagram shown in FIG. 7.

The Connector V in FIG. 7 continues to the connector V' in FIG. 8, and goes to a Subfunction Test 7 decision block 800. The decision block 800 is the seventh in the series of tests to determine which subfunction the Customer Administration subprogram 70 will perform. The decision block 800 employs the subfunction code retrieved in function block 300 in FIG. 3 to test if the subfunction is "Payment Information." If the subfunction is not "Payment Information," the subprogram 70 continues to a Subfunction Test 8 decision block 830. Otherwise, the subprogram 70 proceeds to a Retrieve Payment Information function block 801.

In the Retrieve Payment Information function block 801, the subprogram 70 retrieves the payment information entered by the user and included in the CGI parameters, which were first retrieved in the Parameters function block 101A and stored in the Store Variables function block 102, as shown in FIG. 1. Function block 801 is followed by an Information Complete decision block 802. Decision block 802 tests if the payment information retrieved in step 801 is complete. If not, the Customer Administration subprogram 70 continues with a Generate Payment Information Page function block 803. Otherwise, the payment information is considered complete and the subprogram 70 continues to an Online Payment decision block 810.

In the Online Payment decision block 810, a test is performed to determine if the user specified an online form of payment. An online payment could include any appropriate form of electronic fund transfer. Examples could include a credit card or a debit transfer with a service such as MICROSOFT WALLET™. Other methods of online funds transfer could be easily accommodated by the Control Program 25 of the present invention, as such methods are utilized. If an online payment is specified, the Customer Administration subprogram 70 goes to a Request Online Payment Approval function block 811. By not specifying payment by online methods, a traditional payment method is specified and the subprogram 70 proceeds to a Retrieve User Identification function block step 820.

The Request Online Payment Approval function block 811 employs the online payment information included in the payment information retrieved in function block 801, to request approval of the payment. The preferred implementation of the invention uses CYBERCASH™ software, although any available, standard method or software may be used. The use of online payment approval software and methods is known to anyone versed in the art of constructing e-commerce systems.

An Online Payment Approved decision block 812 follows function block 811 to test if the selected online payment was approved. If the payment is refused, the Customer Administration subprogram 70 goes to a Generate Payment Information Page function block 813. If the online payment is accepted, the subprogram 70 continues to a Retrieve User Identification function block 820.

The Generate Payment Information Page function block 813 generates an HTML page allowing the user to specify payment information. This generated HTML includes an error message indicating the previously entered online payment information was invalid or refused. The HTML page also includes CGI parameters specifying a function of "Customer Administration" and a subfunction of "Payment Information." After generating this HTML page, the subprogram 70 proceeds on path 750 to the Generate Cookie function block 206 in FIG. 2A.

At the Retrieve User Identification function block 820, the user has completed the assignment specification process. The user has chosen a photographer, and has entered a project specification, usage specification, and payment information. Function block 820 retrieves the customer identifier as stored in function block 102, or the function block 106, as shown in FIG. 1.

From function block 820, the Customer Administration subprogram 70 continues to a Store Customer Information function block 821. The function block 821 stores the customer identifier, relating it to the user identification. The preferred implementation again employs an SQL-compliant relational database to store this information, although any persistent storage method is acceptable and considered as an alternative by the present inventors.

From function block 821 the subprogram 70 proceeds to a Send Order Notification function block 825. The function block 825 sends a notification of the order to the photographer chosen for the project, preferably employing the customer identifier retrieved in function block 820, and the payment information retrieved in step 801. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art. The function block 825 is followed by a Generate Receipt Page function block 826.

In the preferred embodiment, the Generate Receipt Page function block 826 includes the generation of an HTML page containing a receipt for the user to print or save. The most preferred implementation generates a receipt including the image or photographer and style chosen, the project specification, the usage specification, payment information, access code, and approval code. Alternatively, other information may be included or removed from the receipt page as desired by the site administrator. After generating the HTML page, the subprogram 70 proceeds on path 750 to the Generate Cookie function block 206 in FIG. 2A.

The Generate Payment Information Page function block 803 generates an HTML page allowing the user to specify payment information. This HTML page includes an error message indicating the previously entered information was incomplete or incorrect. The HTML page will include CGI parameters specifying a function of "Assignment Specification" and a subfunction of "Payment Info." After generating this HTML page, the subprogram 70 proceeds on path 750, to the Generate Cookie function block 206 in FIG. 2A.

At the Retrieve User Identification function block 820, the user has completed the assignment specification process. The user has chosen a photographer, and has entered a project specification, usage specification, and payment information. The function block 820 retrieves the customer identifier as stored in the function block 102, or the function block 106, as shown in FIG. 1.

From function block 820, the Customer Administration subprogram 70 continues to a Store Customer Information function block 821. The function block 821 stores the customer identifier, relating it to the user identification. The preferred implementation again employs an SQL-compliant relational database to store this information, although any persistent storage method is acceptable and considered as an alternative by the present inventors. After the Store Customer Information function block 821, the Customer Administration subprogram 70 proceeds to a Retrieve Project Identifier function block 822, wherein the PROJECT_IDENTIFIER is retrieved. The PROJECT_IDENTIFIER is one of the available "hidden" parameters that were stored in the Store Variables function block 102 of FIG. 1.

A Change Order Payment decision block 823 follows function block 822 to test if the payment being processed is for a change order or the initial bid. If the payment isn't for a change order, the Customer Administration subprogram 70 goes to a Mark Bid Stage Approved function block 824. If the payment is for a change order, the subprogram continues to a Mark Change Order Approved function block 827.

From the Change Order Payment decision block 823, where the payment being processed is the result of a change order, the subprogram 70 proceeds to the Mark Change Order Approved function block 827. The function block 827 marks the change order the payment is for as approved. In the preferred implementation, this is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

From function block 827 the subprogram 70 proceeds to a Send Change Order Notification function block 828. The Send Change Order Notification function block sends a notification of the change order payment to the photographer chosen for the project. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art.

The function block 828 is followed by a Generate Change Order Receipt Page function block 829. In the preferred embodiment, the Generate Change Order Receipt Page function block 829 includes the generation of an HTML page containing a receipt for the user to print or save. The most preferred implementation generates a receipt including the change order and payment information. Alternatively, other information may be included or removed from the receipt page as desired by the site administrator. After generating the HTML page, the subprogram 70 proceeds on path 750 to the Generate Cookie function block 206 in FIG. 2A.

From the Change Order Payment decision block 823, where the payment being processed is not the result of a change order, the Customer Administration subprogram 70 then proceeds to a Mark Bid Stage Approved function block 824. The function block 824 marks the current stage of the project with the PROJECT_IDENTIFIER retrieved in the function block 822 as an approved project stage. In the preferred implementation, this storage is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

From function block 824 the subprogram 70 proceeds to a Send Order Notification function block 825. The function block 825 sends a notification of the order to the photographer chosen for the project, preferably employing the customer identifier retrieved in function block 820, and the payment information retrieved in step 801. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art. The function block 825 is followed by a Generate Receipt Page function block 826. In the preferred embodiment, the Generate Receipt Page function block 826 includes the generation of an HTML page containing a receipt for the user to print or save. The most preferred implementation generates a receipt including the photographer chosen, the project specification, the usage specification, payment information, and approval code. Alternatively, other information may be included or removed from the receipt page as desired by the site administrator. After generating the HTML page, the subprogram 70 proceeds on path 750 to the Generate Cookie function block 206 in FIG. 2A.

From the Subfunction Test 7 decision block 800, when the subfunction was not "Payment Information," the Customer Administration subprogram 70 proceeds to the Subfunction Test 8 decision block 830. The decision block 830 is eighth in the series of tests to determine which subfunction the control program will perform, again employing the SUBFUNCTION_CODE that was retrieved in function block 700. The function block 830 tests if the subfunction is "Customer Input." If not, the SUBFUNCTION_CODE is erroneous, since all other possible subfunction codes have been tested for. With this error, the subprogram 70 proceeds with a Generate Internal Error Page function block 831. If the subfunction is "Customer Input," the subprogram 70 goes to a continuation W of FIG. 8, which proceeds to a corresponding continuation W' and then to an Approval Code decision block 900 in FIG. 9A. The Generate Internal Error Page function block 831 occurs when an unlisted subfunction is retrieved. As the subfunctions are generated internally, this shouldn't occur unless an internal error has occurred. This function block generates an HTML page indicating that this error has occurred and then the subprogram 70 proceeds on path 750 to the Generate Cookie function block 206 in FIG. 2A.

Figure 9A:
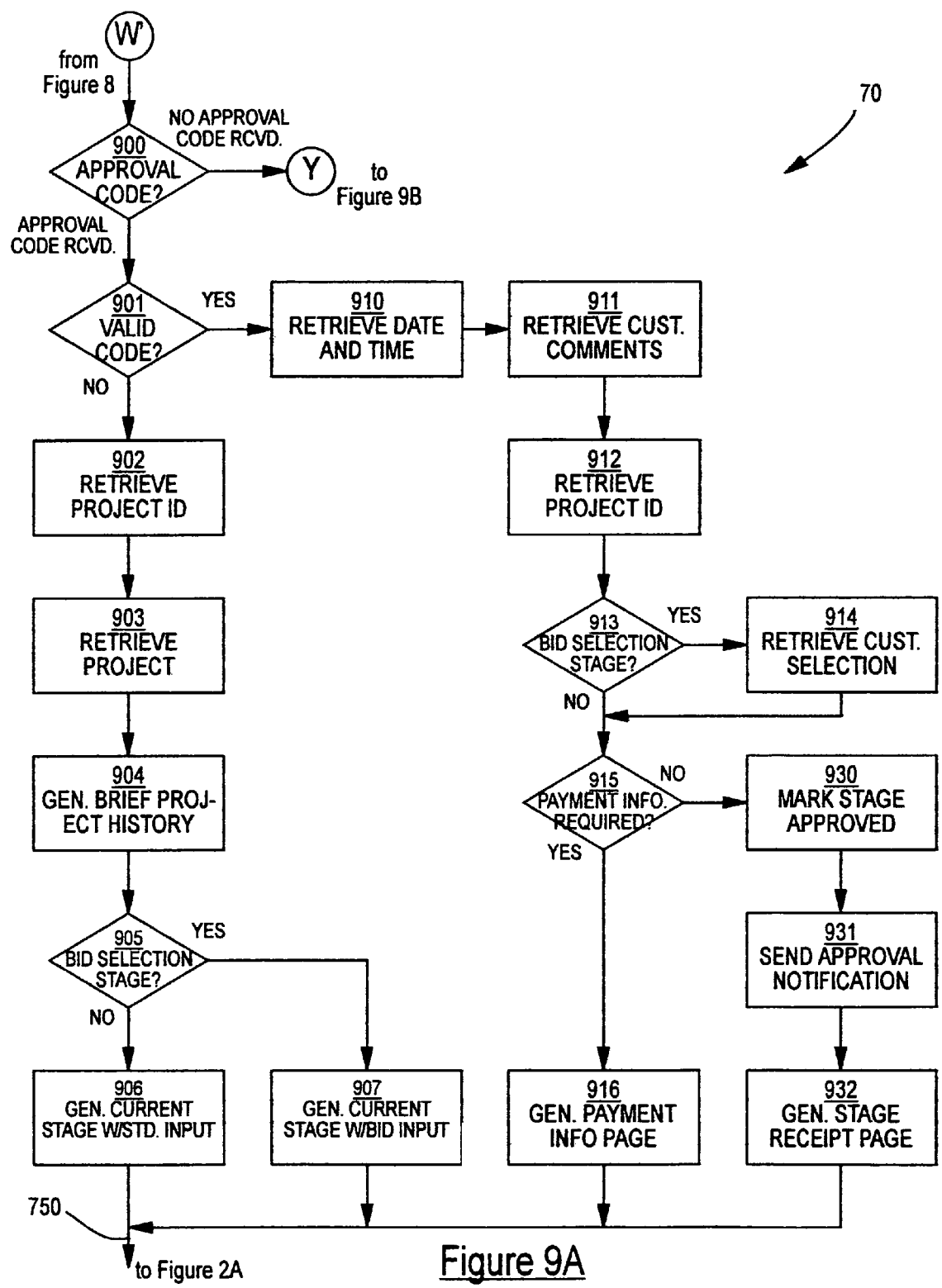
FIG. 9A is a continuation of the flow diagram shown in FIG. 8.

The Connector W in FIG. 8 continues to the connector W' in FIG. 9A. From the continuation W' in FIG. 9A, the Customer Administration subprogram 70 proceeds to the Approval Code decision block 900. At this point in the subprogram 70 the customer has provided some input on the current stage of a project. The decision block 900 tests if an approval code was received. If the approval code is received, the subprogram 70 continues with a Valid Code decision block 901. Otherwise, having no approval code, the subprogram goes to a continuation Y of FIG. 9A, which proceeds to a corresponding continuation Y' and then to a Retrieve Date and Time function block 920 in FIG. 9B.

The Valid Code decision block 901 tests if a valid approval code was received, having the specific parameters stored in the Store Variables function block 102 in FIG. 1. If a valid approval code is not received, the subprogram 70 goes to the Retrieve Project Identification function block 902, which retrieves the PROJECT_IDENTIFIER made available as a "hidden" parameter stored in function block 102 of FIG. 1. If a valid approval code is received, the subprogram proceeds from decision block 901 to a Retrieve Date and Time function block 910.

From the Retrieve Project Identification function block 902, the subprogram 70 continues to a Retrieve Project function block 903. The function block 903 retrieves information associated with the project that specifically includes the PROJECT_IDENTIFIER that was retrieved in the function block 902. Again, this function is preferably constructed with the equivalent of an SQL "select" statement that is passed to the SQL-compliant relational database used to store persistent information.

After the Retrieve Project function block 903, a Generate Brief Project History function block 904 is performed. The function block 904 generates HTML to display a brief history of the project that was retrieved in function block 903. The function block 904 additionally displays an error message indicating an invalid approval code was entered. The preferred implementation constructs the display of each stage in the project, so that selecting the specific project runs the control program 25. The function block 904 also specifies the number of the stage and the project identifier, and stores the function of "Project History," and a subfunction of the "Display Stage" in "hidden" parameters. The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

The subprogram 70 proceeds from the function block 904 to a Bid Selection Stage decision block 905. The decision block 905 tests if the current stage is the one at which the customer must choose from a number of competing bids submitted by the photographers originally selected for the project. If not, the subprogram 70 proceeds to a Generate Current Stage with Standard Input function block 906. If the current stage is the one at which the customer chooses a bid, the subprogram 70 proceeds to a Generate Current Stage with Bid Input function block 907. The Generate Current Stage with Standard Input function block 906 employs the HTML generated in the function block 904 to generate an HTML page containing the brief project history and input elements allowing the user to make comments about the present, selected revision stage or to approve the present stage. This generated page also contains "hidden" parameters specifying a function of "Customer Administration" and a subfunction of "Customer Input." After the function block 906 generates the HTML page, the subprogram 70 proceeds on path 750 to the Generate Cookie function block 206 in FIG. 2A. The Generate Current Stage with Bid Input function block 907 employs the HTML generated in the function block 904 to generate an HTML page containing the brief project history and input elements allowing the user to select one of the bids provided by the photographers initially chosen by the customer to take part in the project. This generated page also contains "hidden" parameters specifying a function of "Customer Administration" and a subfunction of "Customer Input." After the function block 907 generates the HTML page, the subprogram 70 proceeds on path 750 to the Generate Cookie function block 206 in FIG. 2A.

With a valid approval code as determined by Valid Code decision block 901, a Retrieve Date and Time function block 910 executes. The function block 910 obtains the current date and time. This function is performed in a system and language dependent manner familiar to anyone versed in the art. From the function block 910, a Retrieve Customer Comments function block 911 is performed. The function block 911 retrieves the customer comments entered by the user and included in the CGI parameters, which were first retrieved in the Parameters function block 101A and stored in the Store Variables function block 102, as shown in FIG. 1. Following the function block 911, a Retrieve Project Identifier function block 912 is executed. The function block 912 retrieves the PROJECT_IDENTIFIER made available in the "hidden" parameters, which were stored in the function block 102 of FIG. 1.

After the Retrieve Project Identifier function block 912, the Customer Administration subprogram 70 proceeds to a Bid Selection Stage decision block 913. The decision block 913 tests if the current stage is the one at which the customer must choose from a number of competing bids submitted by the photographers originally selected for the project. If so, the subprogram 70 proceeds to a Retrieve Customer Selection function block 914, otherwise the subprogram 70 proceeds to a Payment Information Required decision block 915. The function block 914 retrieves the photographer selected by the user for the project included in the CGI parameters, which were first retrieved in the Parameters function block 101A and stored in the Store Variables function block 102, as shown in FIG. 1. From function block 914, the subprogram 70 proceeds to the Payment Information Required decision block 915. The Payment Information Required decision block 915 tests if the approval of the current stage requires payment information from the customer. Examples of such stages are the bid selection stage and change order stages. If the current stage requires payment information from the customer, the subprogram 70 proceeds to a Generate Payment Information Page function block 916. If the current stage doesn't require payment information, the subprogram 70 proceeds to a Mark Stage Approved function block 930.

A Generate Payment Information Page function block 916 follows decision block 915 when customer payment information is required. Function block 916 generates an HTML page that allows the user to specify payment information. This HTML page will include CGI parameters specifying a function of "Customer Administration" and a subfunction of "Payment Information." After generating the HTML page, the Assignment Specification subprogram 70 proceeds on path 750 to the Generate Cookie function block 206 in FIG. 2A. If payment information isn't required, the subprogram 70 proceeds from decision block 915 to the Mark Stage Approved function block 930. The function block 930 marks the current stage of the project with the PROJECT_IDENTIFIER retrieved in step 912 as an approved project stage. The function block 930 also stores the date and time obtained in the Retrieve Date and Time function block 910, as well as the customer comments retrieved in function block 911. In the preferred implementation, this retrieval and storage is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

The function block 930 is followed by a Send Approval Notification function block 931. The function block 931 sends notification of the stage approval to the photographer chosen for the project. The function block 931 also sends this notification to the host or administrator of the site for billing and tracking purposes. The preferred implementation uses standard MIME-compatible e-mail messages, although any online notification method may be alternatively employed. The construction and sending of a MIME-compatible e-mail message is a standard function known to anyone skilled in the pertinent art.

After the notifications of function block 931, a Generate Stage Receipt function block 932 executes. The function block 932 generates an HTML page containing a receipt for the user to print or save. The preferred implementation generates a receipt including the date and time and PROJECT_IDENTIFIER, although other information may be included or removed as alternative embodiments of the present invention. After generating the HTML page, the Customer Administration subprogram 70 proceeds on path 750 to the Generate Cookie function block 206 in FIG. 2A.

Figure 9B:
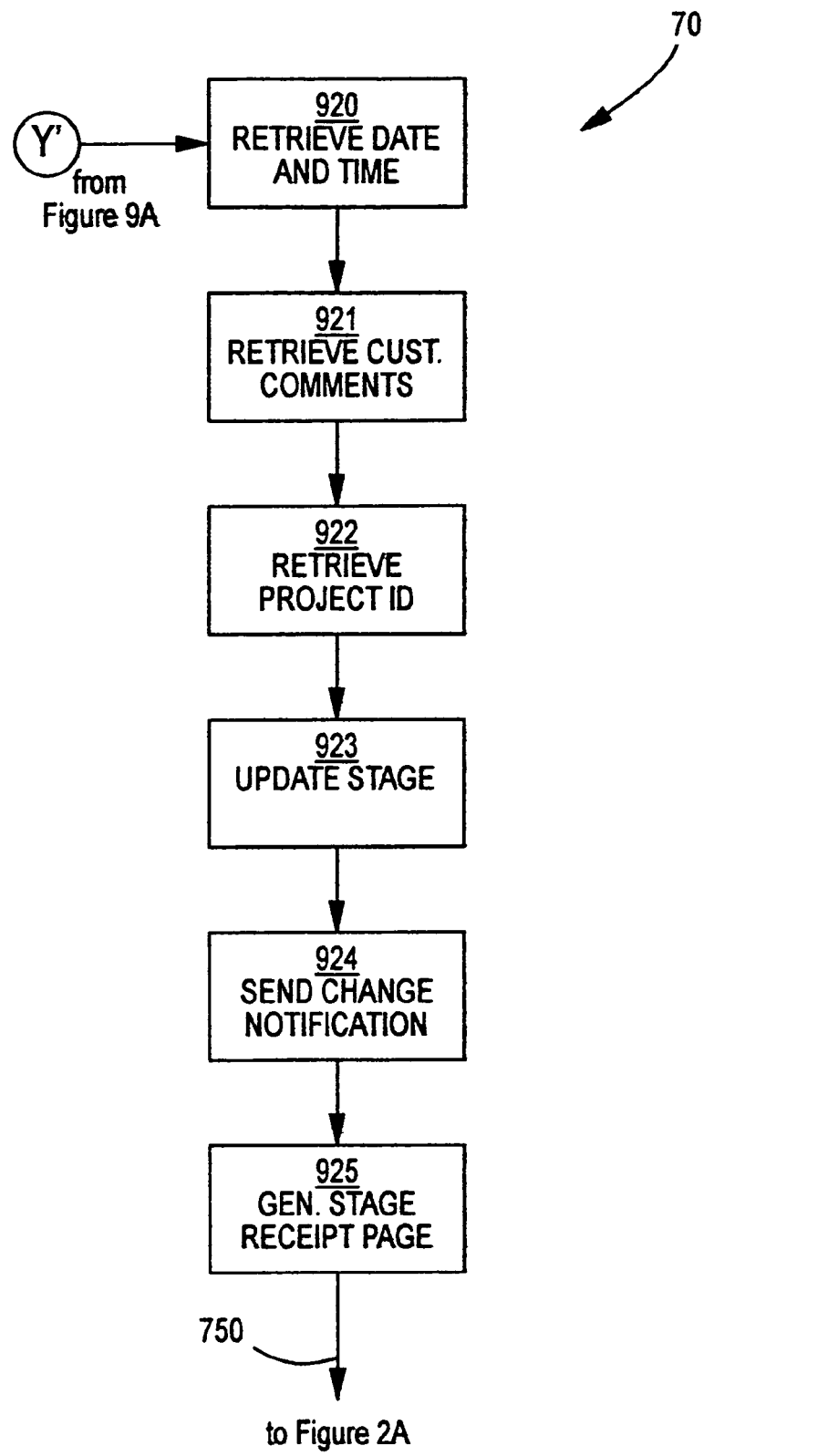
FIG. 9B is a continuation of the flow diagram shown in FIG. 9A.

In FIG. 9B, which is continued from FIG. 9A, the Retrieve Date and Time function block 920 follows from the Approval code decision block 900 receiving no approval code. The function block 920 obtains the current date and time. This function is performed in a system and language dependent manner familiar to anyone versed in the art of programming such functions. From function block 920, a Retrieve Customer Comments function block 921 is performed. The function block 921 retrieves the customer comments entered by the user and included in the CGI parameters, which were first retrieved in the Parameters function block 101A and stored in the Store Variables function block 102, as shown in FIG. 1. Following the function block 921, a Retrieve Project Identifier function block 922 is executed. The function block 922 retrieves the PROJECT_IDENTIFIER made available in the "hidden" parameters, which were stored in the function block 102 of FIG. 1.

After the Retrieve Project Identifier function block 922, the Customer Administration subprogram 70 proceeds to an Update Stage function block 923. The function block 923 updates the current stage of the project with the specific PROJECT_IDENTIFIER retrieved in function block 922. The function block 923 additionally stores the date and time obtained in function block 920, as well as the customer comments retrieved in function block 921. In the preferred implementation of the present invention, this retrieval and storage is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

The function block 923 is followed by a Send Change Notification function block 924. For tracking purposes, the function block 924 sends notification of the stage update to the photographer chosen for the project. The function block 924 also sends this notification to the host or administrator of the site for billing and tracking purposes. The preferred implementation again employs standard MIME-compatible e-mail messages, although any online notification method may be alternatively employed. Additionally, the construction and sending of a MIME-compatible e-mail message is a standard function known to anyone skilled in the pertinent art.

After the notifications of the function block 924, a Generate Stage Receipt function block 925 executes. The function block 925 generates an HTML page containing a receipt for the user to print or save. The preferred implementation generates a receipt including the date, time and PROJECT_IDENTIFIER, although other information may be included or removed as alternative embodiments of the present invention. After generating the HTML page, the Customer Administration subprogram 80 proceeds on path 850 to the Generate Cookie function block 206 in FIG. 2A.

Figure 10:
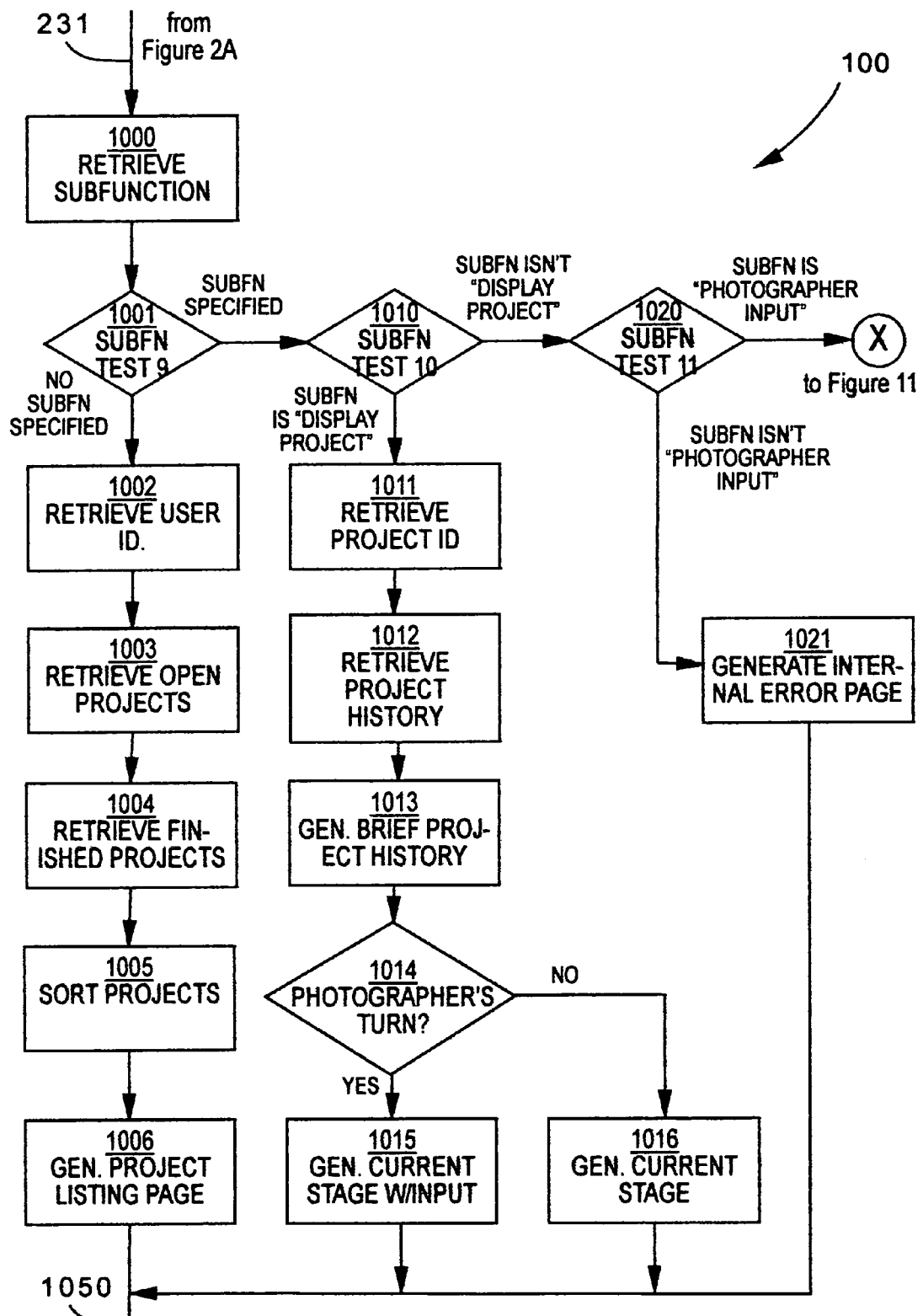
FIG. 10 is a flow diagram of the Photographer Administration subprogram shown in FIG. 2A.
Figure 11:
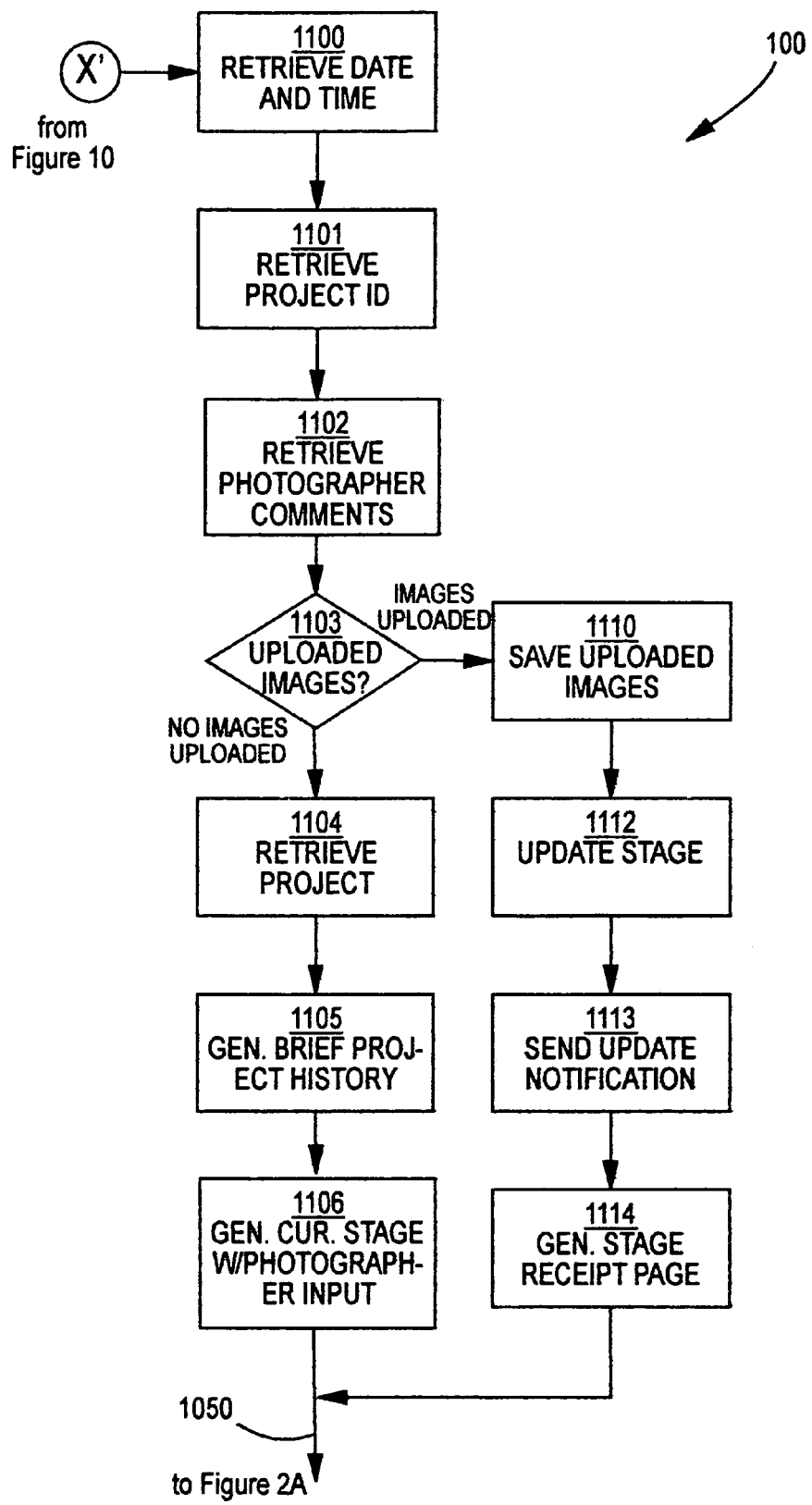
FIG. 11 is a continuation of the flow diagram shown in FIG. 10.

The Photographer Administration subprogram 100 is schematically detailed in FIGS. 10 and 11. In FIG. 10, a Retrieve Subfunction function block 1000 continues on path 231 from the decision block 230 when the function is "Photographer Administration," as shown in FIG. 2A. The function block 1000 retrieves from memory the SUBFUNCTION_CODE determined by the CGI parameters stored in the Store Variables function block 102. The SUBFUNCTION_CODE determines which of several possible subfunctions the control program will perform.

The Photographer Administration subprogram 100 continues from the function block 1000 to a Subfunction Test 9 decision block 1001. The decision block 1001 is the ninth of the series of tests to determine which subfunction the control program 25 will perform, using the SUBFUNCTION_CODE retrieved in the function block 1000. If no subfunction was specified, the subprogram 100 proceeds to a Retrieve User Identification function block 1002. If a subfunction was specified, the subprogram 100 continues to a Subfunction Test 10 decision block 1010.

In the Retrieve User Identification function block 1002 the USER_IDENTIFIER stored in the function block 102 or the function block 106, as shown in FIG. 1, is retrieved. In function block 1002, the USER_IDENTIFIER is used to identify a photographer. From the function block 1002, the Photographer Administration subprogram 100 continues to a Retrieve Open Projects function block 1003. In the function block 1003 all pertinent information is retrieved on any "open" or in-progress projects having an associated photographer identifier equal to the user identifier retrieved in the function block 1002. In the preferred implementation, this function is achieved by constructing an SQL "select" statement. The subprogram 100 passes the select statement to the SQL-compliant relational database used to store persistent information. In alternative implementations of the present invention, other persistent storage methodologies could be employed, along with the appropriate procedure to retrieve data under those storage methodologies.

From the Retrieve Open Projects function block 1003, the Photographer Administration subprogram 100 proceeds to a Retrieve Finished Projects function block 1004. The function block 1004 retrieves information on all finished projects having an associated photographer identifier equal to the user identifier retrieved in the Retrieve User Identification function block 1002. As in the function block 1003, a procedure appropriate to the persistent storage methodology in use is preferably employed. After the function block 1004, the subprogram 100 continues to a Sort Projects function block 1005. The function block 1005 sorts the projects retrieved in the function block 1003 and in the function block 1004.

In the preferred implementation of the present invention, the Sort Projects function block 1005 performs a first sort of those open projects that still need input from the photographer. The function block 1005 follows the first sort of open projects by performing a second sort of open projects awaiting customer input. Finally, the function block 1005 performs a third sort of finished projects. Alternative implementations may certainly sort the projects in an equivalent, preselected scheme, or may allow the user to specify a more preferential sort order.

After the Sort Projects function block 1005 the Photographer Administration subprogram 100 proceeds to a Generate Project Listing Page function block 1006. The function block 1006 generates an HTML page presenting the projects sorted in the function block 1005. In the preferred implementation of the present invention, the display of each open project is constructed in such a way that a selection of a particular project executes the control program 25 for that project. This function block 1006 can be programmed to perform this routine by any technician versed in the art of such programming.

Additionally, it is preferred to specify "hidden" parameters with the project's unique PROJECT_IDENTIFIER, a function of "Photographer Administration," and a subfunction of "Display Project." The display of finished projects is constructed so that selecting the project runs the control program, specifying in "hidden" parameters the PROJECT_IDENTIFIER of the project, a function of "Project History," and a subfunction of "Display Project."

The page generated by the function block 1006 also includes an entry field and a "submit" button. The entry field and submit button are HTML elements that are readily constructed by anyone skilled in the art of web page construction. This generated page allows the user to enter the PROJECT_IDENTIFIER of a project to be displayed. After generating the HTML page, the Photographer Administration subprogram 100 proceeds on path 1050 to the Generate Cookie function block 206 in FIG. 2A.

From the Subfunction Test 9 decision block 1001, where the subfunction was specified, the subprogram 100 proceeds to the Subfunction Test 10 decision block 1010. In the decision block 1010 a tenth in the series of tests to determine which subfunction the control program will execute, is performed. The decision block 1010 employs the SUBFUNCTION_CODE retrieved in the Retrieve Subfunction function block 1000. If the subfunction is "Display Project," the subprogram 100 continues to a Retrieve Project Identifier function block 1011. If the subfunction is not "Display Project," the subprogram 100 goes to a Subfunction Test 11 decision block 1020.

In the Retrieve Project Identifier function block 1011, the PROJECT_IDENTIFIER is retrieved. The PROJECT_IDENTIFIER is one of the available "hidden" parameters that were stored in the Store Variables function block 102 of FIG. 1. The subprogram 100 then proceeds to the Retrieve Project History function block 1012 to retrieve information associated with the selected project having the PROJECT_IDENTIFIER retrieved in function block 1011. In the preferred implementation of the present invention, this retrieval is achieved by constructing a simple SQL "select" statement, which is a well-established procedure. The select statement is passed to the SQL-compliant relational database, or equivalent system employed to store persistent information.

From the Retrieve Project History function block 1012, the Photographer Administration subprogram 100 generates HTML to display a brief history of the specific project retrieved in the function block 1012. The preferred implementation constructs the display of each revisional stage M in the specified project such that selecting the project runs the control program 25. Additionally, as preferred, the function block 1013 specifies in "hidden" parameters a sequential number that is assigned to each revisional stage, the PROJECT_IDENTIFIER, a function of "Project History," and a subfunction of "Display Stage." The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

After the Generate Brief Project History function block 1013, the Photographer Administration subprogram 100 proceeds to a Photographer's Turn decision block 1014. The decision block 1014 tests if the current stage requires input from the photographer. If input is required of the photographer, the subprogram 100 proceeds to a Generate Current Stage with Input function block 1015. If no input is required, the subprogram 100 proceeds to a Generate Current Stage function block 1016.

The Generate Current Stage with Input function block 1015 employs the HTML generated in function block 1013 to generate an HTML page containing the brief project history and input elements allowing the photographer to make comments about the present, selected revision stage or to upload images. This generated page also contains "hidden" parameters specifying a function of "Photographer Administration" and a subfunction of "Photographer Input." After the function block 1015 generates the HTML page, the subprogram 100 proceeds on path 1050 to the Generate Cookie function block 206 in FIG. 2A.

The Generate Current Stage function block 1016 also employs the HTML generated in function block 1013 to generate an HTML page containing the brief project history. Because this function block 1016 awaits the customer's input, no input elements are provided for photographer comment or image upload. After the function block 1016 generates the HTML page, the subprogram 100 proceeds on path 1050 to the Generate Cookie function block 206 in FIG. 2A.

From the Subfunction Test 10 decision block 1010, when the subfunction was not "Display Project," the Photographer Administration subprogram 100 proceeds to the Subfunction Test 11 decision block 1020. The decision block 1020 is eleventh in the series of tests to determine which subfunction the control program will perform, again employing the SUBFUNCTION_CODE that was retrieved in function block 1000. The function block 1020 tests if the subfunction is "Photographer Input." If the subfunction is not "Photographer Input," the SUBFUNCTION_CODE is erroneous, since all other possible subfunctions codes have been tested for. With this error, the subprogram 100 proceeds with a Generate Internal Error Page function block 1021. Otherwise, the subprogram 100 goes to a continuation X in FIG. 10, which proceeds to a corresponding continuation X' and then to a Retrieve Date and Time function block 1100 in FIG. 11.

The Generate Internal Error Page function block 1021 occurs when an unlisted subfunction is retrieved. As the subfunctions are generated internally, this shouldn't occur unless an internal error has occurred. The function block generates an HTML page indicating that this error has occurred and then the subprogram 100 proceeds on path 1050 to the Generate Cookie function block 206 in FIG. 2A.

From the continuation X' in FIG. 11, the Photographer Administration subprogram 100 proceeds to the Retrieve Date and Time function block 1100. The function block 1100 obtains the current date and time. This function is performed in a system and language dependent manner familiar to anyone versed in the art of programming such functions. From function block 1100, a Retrieve Project Identifier function block 1101 is executed. The function block 1101 retrieves the PROJECT_IDENTIFIER made available in the "hidden" parameters, which were stored in the function block 102 of FIG. 1.

At this point in the subprogram 100 the photographer has submitted a page to start a new review stage of a specific project. The photographer submitted page may include comments with an image either revised from a previous image or a new image. After the Retrieve Project Identifier function block 1101, the Photographer Administration subprogram 100 continues to a Retrieve Photographer Comments function block 1102. The function block 1102 retrieves any comments made by the photographer for display to the user in a following step. The decision block 1103 then tests if the photographer uploaded any images. If images were uploaded, the subprogram goes to a Save Uploaded Images decision block 1110. If images were not uploaded, the subprogram 100 proceeds to a Retrieve Project function block 1104.

The Retrieve Project function block 1104 retrieves information associated with the project that specifically includes the PROJECT_IDENTIFIER that was retrieved in the function block 1101. Again, this function is preferably constructed with the equivalent of an SQL "select" statement that is passed to the SQL-compliant relational database used to store persistent information. After the function block 1104, a Generate Brief Project History function block 1105 is performed. The function block 1105 generates HTML to display a brief history of the project that was retrieved in function block 1104. The preferred implementation constructs the display of each stage in the project, so that selecting the specific project runs the control program 25. The function block 1105 also specifies in "hidden" parameters, the number of the stage, the PROJECT_IDENTIFIER, a function of "Project History," and a subfunction of the "Display Stage." The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

Figures 19, 20:
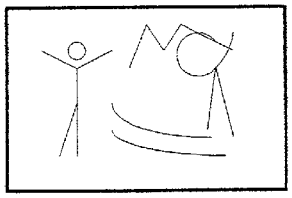
FIG. 19 is a representative user interface display of the "photograph usage specification" step of the invention.
FIG. 20 is a representative user interface display of the "complete project assignment" step of the invention.

Employing the HTML generated in function block 1105 a Generate Current Stage with photographer Input function block 1106 is then executed. The function block 1106 generates an HTML page containing the brief project history, and includes display of any comments retrieved in the Retrieve Photographer Comments function block 1102. Function block 1106 also includes elements that allow the photographer to make comments about the current stage or for the customer to approve the stage. The function block 1106 additionally displays an error message indicating no images were uploaded. The generated page also contains "hidden" parameters specifying a function of "Photographer Administration" and a subfunction of "Photographer Input." FIG. 20 is a representative user interface display of this HTML, which is also employed when project assignment is complete. After the function block 1106 generates the HTML page, the subprogram 100 proceeds on path 1050 to the Generate Cookie function block 206 in FIG. 2A.

The Save Uploaded Images function block 1110 follows from the Uploaded Images decision block 1103 when images were received from the photographer. At this point, the photographer has uploaded one or more images. The function block 1110 retrieves the uploaded images from the CGI environment and stores them. The retrieval of data from a CGI environment is a standard function known to anyone skilled in web page programming. The preferred implementation stores the images in the file system of the server hosting the control program, and saves the names of the files used in an SQL-compliant relational database. However, alternative methods of storing the images are considered as viable alternatives. If this is a final image in a finished project, the control program adds the image to its stock collection, as either kept in the assignment database 1606, shown in FIG. 16, or a separate database, as preferred. If the user has purchased exclusive rights to the image, the image is not available for use as a stock photograph.

From the Save Uploaded Images function block 1110, the Photographer Administration subprogram 100 proceeds to an Update Stage function block 1112. The function block 1112 updates the current stage of the project with the specific PROJECT_IDENTIFIER retrieved in the function block 1101. The function block 1112 additionally stores the date and time obtained in the function block 1100, as well as the uploaded images stored in the function block 1110. In the preferred implementation of the present invention, this retrieval and storage is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

Function block 1112 is followed by a Send Update Notification function block 1113. For tracking purposes, function block 1113 sends notification of the stage update to the customer. The function block 1113 also sends this notification to the host or administrator of the site for billing and tracking purposes. The preferred implementation again employs standard MIME-compatible e-mail messages, although any online notification method may be alternatively employed. Additionally, the construction and sending of a MIME-compatible e-mail message is a standard function known to anyone skilled in the pertinent art.

After the notifications of function block 1113, a Generate Stage Receipt Page function block 1114 executes. The function block 1114 generates an HTML page containing a receipt for the photographer to print or save. The preferred implementation generates a receipt including the date and time and PROJECT_IDENTIFIER, although other information may be included or removed as alternative embodiments of the present invention. After generating the HTML page, the Photographer Administration subprogram 100 proceeds on path 1050 to the Generate Cookie function block 206 in FIG. 2A.

Figure 12A:
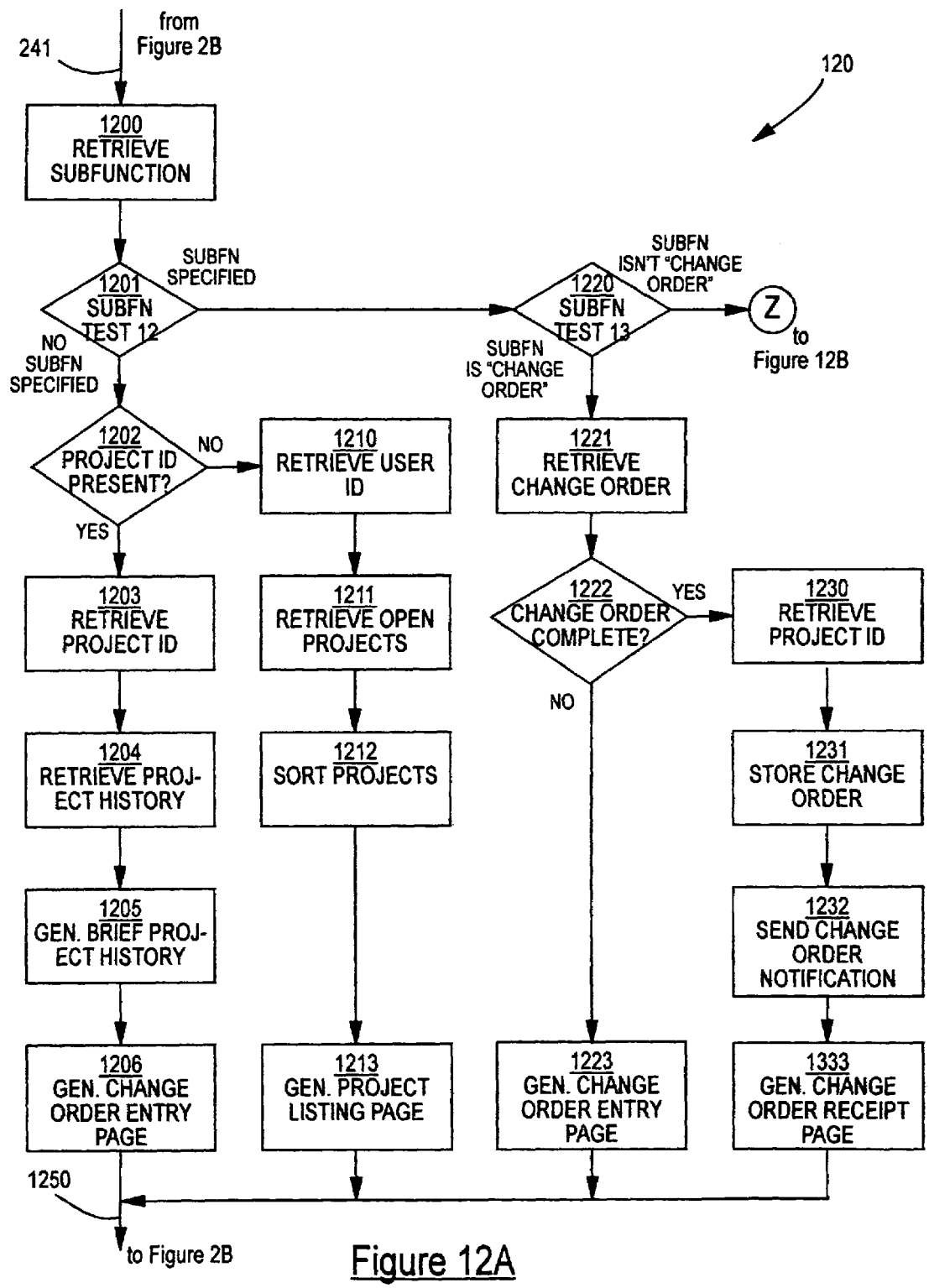
FIG. 12A is a flow diagram of the Change Order Administration subprogram shown in FIG. 2B.
Figure 12B:
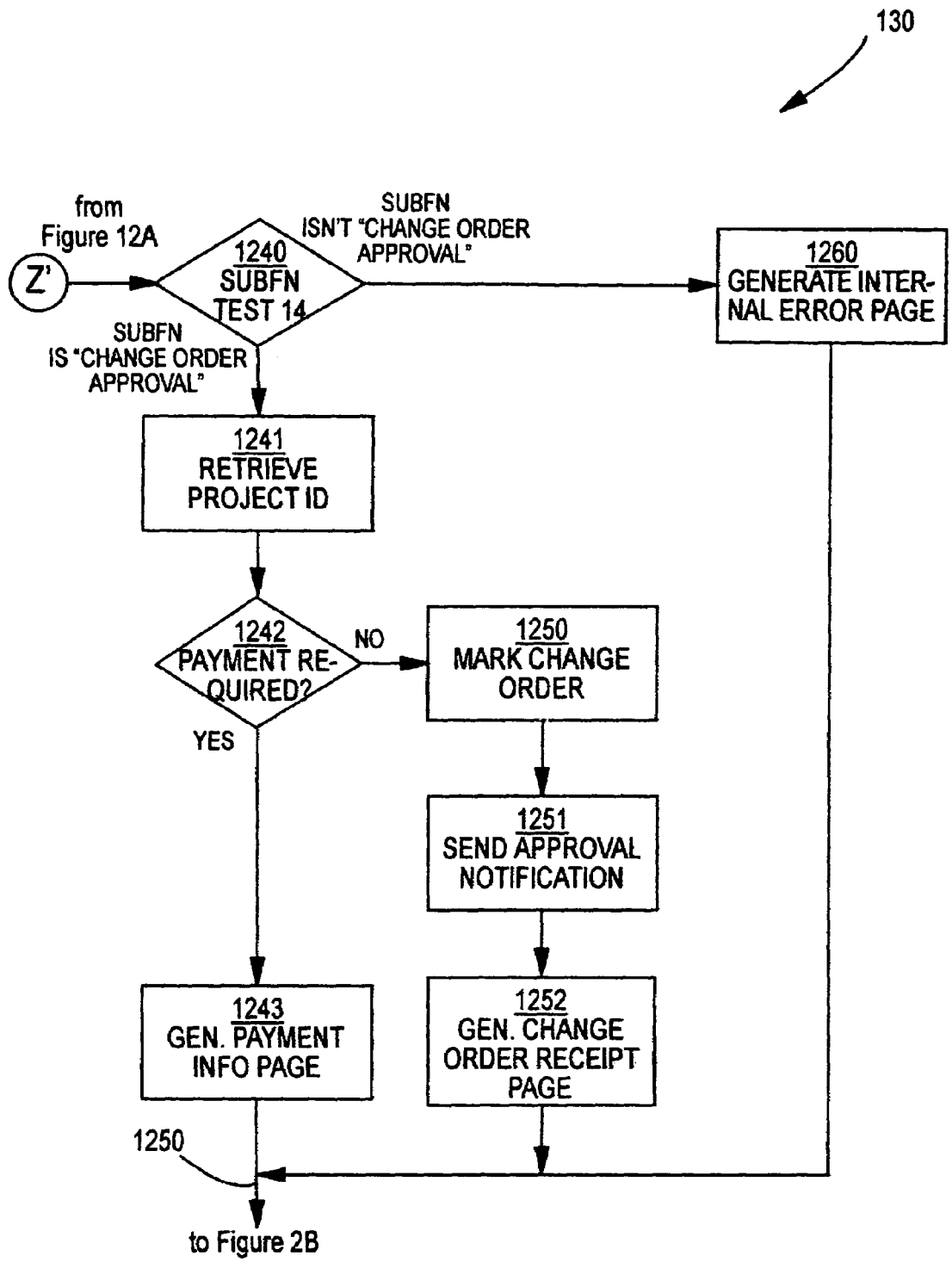
FIG. 12B is a continuation of the flow diagram shown in FIG. 12A.

The Change Order Administration subprogram 120 is schematically detailed in FIGS. 12A and 12B. In FIG. 12A, a Retrieve Subfunction function block 1200 continues on path 241 from the decision block 240 when the function is "Change Order Administration," as shown in FIG. 2B. Function block 1200 retrieves from memory the SUBFUNCTION_CODE determined by the CGI parameters stored in the Store Variables function block 102. The SUBFUNCTION_CODE determines which of several possible subfunctions the control program will perform.

The Change Order Administration subprogram 120 continues from function block 1200 to a Subfunction Test 12 decision block 1201. Decision block 1201 is the twelfth of the series of tests to determine which subfunction the control program 25 will perform, using the SUBFUNCTION_CODE retrieved in function block 1200. If no subfunction was specified, the subprogram 120 proceeds to a Project Identifier Present decision block 1202. The Project Identifier Present decision block tests whether a PROJECT_IDENTIFIER is present. If present, the PROJECT_IDENTIFIER is one of the available "hidden" parameters that were stored in the Store Variables function block 102 of FIG. 1. If the PROJECT_IDENTIFIER is present, the subprogram continues to a Retrieve Project Identification function block 1203. Otherwise, the Change Order Administration subprogram continues to a Subfunction Test 13 decision block 1220.

In the Retrieve Project Identifier function block 1203, the PROJECT_IDENTIFIER is retrieved. Note that this function block may be performed contemporaneously or as a side effect of the Project Identifier Present decision block 1202. After retrieving the PROJECT_IDENTIFIER, the subprogram 120 proceeds to a Retrieve Project History function block 1204. The function block 1204 retrieves information associated with the project that specifically includes the PROJECT_IDENTIFIER that was retrieved in the function block 1203. Again, this function is preferably constructed with the equivalent of an SQL "select" statement that is passed to the SQL-compliant relational database used to store persistent information.

From the Retrieve Project History function block 1204, the Change Order Administration subprogram 120 continues to a Generate Brief Project History function block 1205. This function block 1205 generates HTML to display a brief history of the specific project retrieved in the function block 1204. The preferred implementation constructs the display of each revisional stage in the specified project such that selecting the project runs the control program 25. Additionally, as preferred, the function block 1205 specifies in "hidden" parameters, a sequential number that is assigned to each revisional stage, the PROJECT_IDENTIFIER, a function of "Project History," and a subfunction of "Display Stage."

After generating the project history in the function block 1205, the subprogram 120 continues to a Generate Change Order Entry Page function block 1206. The Generate Change Order Entry function block 1206 employs the HTML generated in the function block 1205 to generate an HTML page containing the brief project history and input elements allowing the user to enter the change order. After the function block 1206 generates the HTML page, the Change Order Administration subprogram proceeds on path 1250, to the connector C in FIG. 2B, then to the corresponding connector C' in FIG. 2A and on to the Generate Cookie function block 206, also in FIG. 2A.

From the Project Identifier Present decision block 1202, where the PROJECT_IDENTIFIER was specified, the subprogram 120 proceeds to a Retrieve User Identifier function block 1210. In the Retrieve User Identifier function block 1210, the USER_IDENTIFIER stored in the function block 102 or function block 106, as shown in FIG. 1, is retrieved. The USER_IDENTIFIER may identify a client or a photographer. From function block 1210 the Change Order Administration subprogram 120 continues to a Retrieve Open Projects function block 1211. In function block 1211 all pertinent information is retrieved on any "open" or in-progress projects having an associated USER_IDENTIFIER equal to the USER_IDENTIFIER retrieved in function block 1210. In the preferred implementation, this function is achieved by constructing an SQL "select" statement, a procedure known to those versed in the art. The Change Order Administration subprogram passes the select statement to the SQL-compliant relational database used to store persistent information. In alternative implementations of the present invention, other persistent storage methodologies could be employed, along with the appropriate procedure to retrieve data under those storage methodologies.

From the Retrieve Open Projects function block 1211, the Change Order Administration subprogram 120 proceeds to a Sort Projects function block 1212. The function block 1212 sorts the projects retrieved in the function block 1211. In the preferred implementation of the present invention, the Sort Projects function block sorts the projects based upon how long the project has been awaiting input and the age of the project. Alternative implementations may sort the projects in a different, preselected manner, or may allow the user to specify a more preferential sort order.

After the Sort Projects function block 1212, the Change Order Administration subprogram 120 proceeds to a Generate Project Listing Page function block 1213. The function block 1213 generates an HTML page presenting the projects sorted in the Generate Project Listing Page function block. In the preferred implementation of the present invention, the display of each open project is constructed in such a way that a selection of a particular project executes the control program 25 for that project. This Generate Project Listing Page function block can be constructed to perform this routine by any technician versed in the art of such programming.

Additionally, it is preferred to include with each project a link or "submit" button and "hidden" parameters with the project's unique PROJECT_IDENTIFIER, a function of "Change Order Administration," and no subfunction. The link and submit button are HTML elements readily constructed by anyone skilled in the art of web page construction. After generating the HTML page, the subprogram 120 proceeds on path 1250, to the connector C in FIG. 2B, then to the corresponding connector C' in FIG. 2A and on to the Generate Cookie function block 206, also in FIG. 2A.

From the Subfunction Test 12 decision block 1201, where the subfunction for the change order administration function was specified, the subprogram 120 proceeds to the Subfunction Test 13 decision block 1220. The decision block 1220 is the thirteenth in the series of tests to determine which subfunction the control program will execute. The decision block 1220 employs the SUBFUNCTION_CODE retrieved in the Retrieve Subfunction function block 1200. If the subfunction is "Change Order," the subprogram 120 continues to a Retrieve Change Order function block 1221. If the subfunction is not "Change Order," the subprogram 120 goes to a continuation Z of FIG. 12A, which proceeds to a corresponding continuation Z' and then to a Subfunction Test 14 decision block 1240 in FIG. 12B.

The Retrieve Change Order function block 1221 retrieves the change order entered by the user and included in the CGI parameters, which were first retrieved in the Parameters function block 101A and stored in the Store Variables function block 102, as shown in FIG. 1. The function block 1221 is followed by a Change Order Complete decision block 1222. The decision block 1222 tests if the change order retrieved in function block 1222 is complete. If the change order is not complete, the Change Order Administration subprogram 120 continues to a Generate Change Order Entry Page function block 1223. If the usage specification is complete, the subprogram 120 goes to a Retrieve Project Identifier function block 1230.

The Generate Change Order Entry Page function block 1223 generates an HTML page allowing the user to enter a change order and including an error message indicating the prior change order was incomplete. This HTML page will include CGI parameters specifying a function of "Change Order Administration" and a subfunction of "Change Order." After generating the HTML page in function block 1223, the subprogram 120 proceeds on path 1250, to the connector C in FIG. 2B, then to the corresponding connector C' in FIG. 2A and on to the Generate Cookie function block 206, also in FIG. 2A.

The Retrieve Project Identifier function block 1230 is reached from the decision block 1222 when the change order retrieved in the function block 1221 is complete. The function block 1230 retrieves the PROJECT_IDENTIFIER. The PROJECT_IDENTIFIER is one of the available "hidden" parameters that were stored in the Store Variables function block 102 of FIG. 1. Following function block 1230, a Store Change Order function block 1231 employs the PROJECT_IDENTIFIER retrieved in function block 1230 to store the change order retrieved in function block 1221. The preferred implementation again uses an SQL-compliant relational database to store this and other pertinent information, although any persistent storage method is acceptable.

From function block 1231, the Change Order Administration subprogram 120 continues to a Send Change Order Notification function block 1232. The function block 1232 sends a notification of the change order to the photographer if the customer has entered the change order or to the customer if the photographer has entered the change order. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art.

From the function block 1232, the subprogram 120 proceeds to a Generate Change Order Receipt Page function block 1233. The function block 1233 generates an HTML page containing a receipt for the user to print or save. The preferred implementation generates a receipt including the date, time, PROJECT_IDENTIFIER, and change order information, although other information may be included or removed as alternative embodiments of the present invention. After generating the HTML page, the Change Order Administration subprogram 120 proceeds on path 1250, to the connector C in FIG. 2B, then to the corresponding connector C' in FIG. 2A and on to the Generate Cookie function block 206, also in FIG. 2A.

The Connector Z in FIG. 12A continues to the connector Z' in FIG. 12B, and goes to a Subfunction Test 14 decision block 1240. The decision block 1240 is the fourteenth in the series of tests to determine which subfunction the Change Order Administration subprogram 120 will perform. The decision block 1240 employs the subfunction code retrieved in function block 1200 in FIG. 12A to test if the subfunction is "Change Order Approval." If the subfunction is not "Change Order Approval," the SUBFUNCTION_CODE is erroneous, since all other possible subfunctions codes have been tested for. With this error, the subprogram 120 proceeds with a Generate Internal Error Page function block 1260. Otherwise, the Change Order Administration subprogram goes to a Retrieve Project Identifier function block 1241.

The Retrieve Project Identifier function block 1241 is reached from the decision block 1240 when the SUBFUNCTION_CODE is "Change Order Approval." The function block 1241 retrieves the PROJECT_IDENTIFIER. The PROJECT_IDENTIFIER is one of the available "hidden" parameters that were stored in the Store Variables function block 102 of FIG. 1. Following function block 1241, a Payment Required decision block 1242 tests if payment for the change in the project resulting from the change order is required. If payment is required, the subprogram 120 continues with a Generate Payment Information Page function block 1243. If payment isn't required, the Change Order Administration subprogram proceeds to a Mark Change Order Approved function block 1250.

The Generate Payment Information Page function block 1243 generates an HTML page allowing the user to specify payment information. The HTML page includes CGI parameters specifying a function of "Customer Administration" and a subfunction of "Payment Information." After generating this HTML page, the subprogram 120 proceeds on path 1250, to the connector C in FIG. 2B, then to the corresponding connector C' in FIG. 2A and on to the Generate Cookie function block 206, also in FIG. 2A.

From the Payment Required decision block 1242, where no payment is required, the Change Order Administration subprogram 120 proceeds to the Mark Change Order Approved function block 1250. The function block 1250 marks the change order as approved. In the preferred implementation, this is achieved by constructing a conventionally formatted SQL "update" statement that is passed to the SQL-compliant relational database used to store persistent information. Again, other alternative storage methodologies can certainly be employed in the present invention as can the appropriate procedure to update data under those storage methodologies.

From function block 1250 the Change Order Administration subprogram 120 proceeds to a Send Approval Notification function block 1251. The function block 1251 sends a notification of the change order approval to the photographer chosen for the project. A notification is also preferably sent to the host or administrator of the site for billing and tracking purposes. The preferred implementation of the present invention employs standard MIME-compatible e-mail messages, although any online notification method may be used. The construction and sending of a MIME-compatible e-mail message is a standard function known to anyone versed in the art.

The function block 1251 is followed by a Generate Change Order Receipt Page function block 1252. In the preferred embodiment, the Generate Change Order Receipt Page function block 1252 includes the generation of an HTML page containing a receipt for the user to print or save. The most preferred implementation generates a receipt including the change order information. Alternatively, other information may be included or removed from the receipt page as desired by the site administrator. After generating the HTML page, the subprogram 120 proceeds on path 1250, to the connector C in FIG. 2B, then to the corresponding connector C' in FIG. 2A and on to the Generate Cookie function block 206, also in FIG. 2A.

The Generate Internal Error Page function block 1260 occurs when an unlisted subfunction is retrieved. As the subfunctions are generated internally, this shouldn't occur unless an internal error has occurred. The function block generates an HTML page indicating that this error has occurred and then the subprogram 120 proceeds on path 1250, to the connector C in FIG. 2B, then to the corresponding connector C' in FIG. 2A and on to the Generate Cookie function block 206, also in FIG. 2A.

Figure 13:
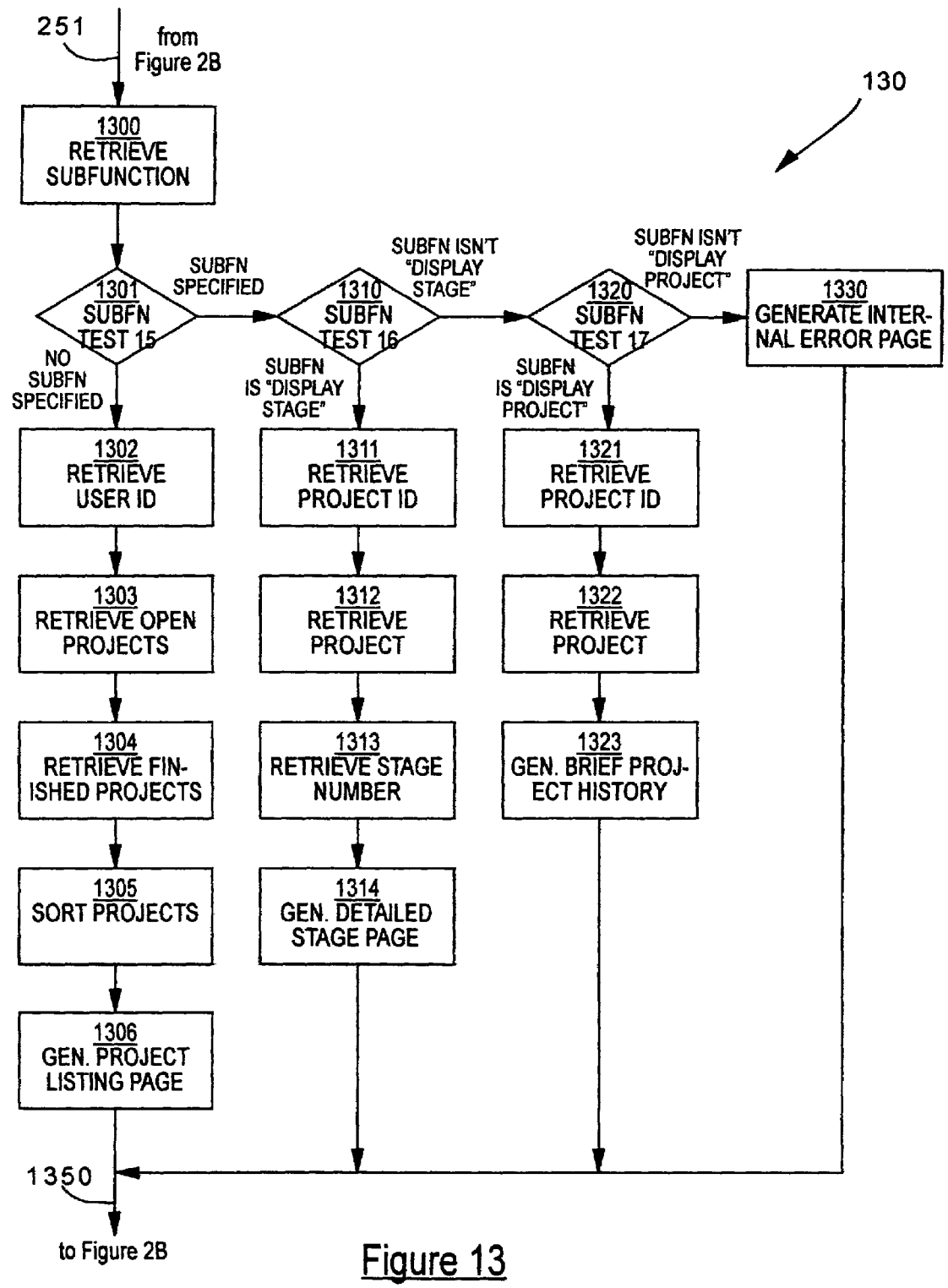
FIG. 13 is a flow diagram of the Project History subprogram shown in FIG. 2B.

The Project History subprogram 130 is schematically detailed in FIG. 13, where a Retrieve Subfunction function block 1300 continues on path 251 from the decision block 250. The function block 1300 executes when the FUNCTION is "Project History," as shown in FIG. 2B. The function block 1300 retrieves from memory the SUBFUNCTION_CODE determined by the CGI parameters stored in the Store Variables function block 102. The SUBFUNCTION_CODE determines which of several possible subfunctions the control program will perform.

The Project History subprogram 130 continues from the function block 1300 to a Subfunction Test 15 decision block 1301. The decision block 1301 is the fifteenth of the series of tests to determine which subfunction the control program 25 will perform, using the SUBFUNCTION_CODE retrieved in the Retrieve Subfunction function block 1300. If no subfunction is specified, the subprogram 130 proceeds to Retrieve User Identification function block 1302. Otherwise, the subprogram 130 continues to a Subfunction Test 16 decision block 1310.

In the Retrieve User Identification function block 1302, the USER_IDENTIFIER stored in the function block 102 or the function block 106, shown in FIG. 1, is retrieved. In function block 1302, the USER_IDENTIFIER is used to identify the user. From the function block 1302, the Project History subprogram 130 continues to a Retrieve Open Projects function block 1303. In the function block 1303 all pertinent information is retrieved on any "open" or in-progress projects having an associated photographer or customer identifier equal to the USER_IDENTIFIER retrieved in the function block 1302. In the preferred implementation, this function is once again achieved by constructing an SQL "select" statement, which is a procedure known to those versed in the art. The subprogram 130 passes the select statement to the SQL-compliant relational database used to store persistent information. In alternative implementations of the present invention, other persistent storage methodologies could be employed, along with the appropriate procedure to retrieve data under those storage methodologies.

From the Retrieve Open Projects function block 1303, the Project History subprogram 130 proceeds to a Retrieve Finished Projects function block 1304. The function block 1304 retrieves information on all finished projects having an associated customer or photographer identifier equal to the USER_IDENTIFIER retrieved in the Retrieve User Identification function block 1302. As in the function block 1303, a procedure appropriate to the persistent storage methodology in use is preferably employed. After the function block 1304, the subprogram 130 continues to a Sort Projects function block 1305. The function block 1305 sorts the projects retrieved in the function block 1303 and in the function block 1304.

In the preferred implementation of the present invention, the Sort Projects function block 1305 performs a first sort of those open projects that still need input from the customer or photographer. The function block 1305 follows the first sort of open projects by performing a second sort of open projects awaiting photographer or customer input. Finally the function block 1305 performs a third sort of finished projects. Alternative implementations may certainly sort the projects in a different, preselected manner, or may allow the user to specify a more preferential sort order.

After the Sort Projects function block 1305 the Project History subprogram 130 proceeds to a Generate Project Listing Page function block 1306. The function block 1306 generates an HTML page presenting the projects sorted in the function block 1305. In the preferred implementation of the present invention, the display of each open project is constructed in such a way that a selection of a particular project executes the control program 25 for that project. The construction of this function block 1306 can be constructed to perform this routine by any tactician versed in the art of such programming. The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

Additionally it is preferred to specify "hidden" parameters with the project's unique PROJECT_IDENTIFIER, a function of "Photographer Administration," and a subfunction of "Display Project." The display of finished projects is preferably of conventional construction, so that selecting the project runs the control program, specifying from the "hidden" parameters, the PROJECT_IDENTIFIER of the project, a function of "Project History," and a subfunction of "Display Project."

The HTML page generated by the Generate Project Listing Page function block 1306 also includes an entry field and a "submit" button. The entry field and the submit button are HTML elements readily constructed by anyone skilled in the art of web page construction. This generated page allows the user to enter the PROJECT_IDENTIFIER of a project to be displayed. After generating the HTML page, the Project History subprogram 130 proceeds on path 1350, to the connector C in FIG. 2B, then to the corresponding connector C' in FIG. 2A and on to the Generate Cookie function block 206, also in FIG. 2A.

From the Subfunction Test 15 decision block 1301, when the subfunction was specified, the Project History subprogram 130 proceeds to the Subfunction Test 16 decision block 1310. The decision block 1310 is sixteenth in the series of tests to determine which subfunction the control program will execute. The decision block 1310 employs the SUBFUNCTION_CODE retrieved in the Retrieve Subfunction function block 1300. If the subfunction is "Display Stage," the subprogram 130 continues to a Retrieve Project Identifier function block 1311. If the subfunction is not "Display Stage," the subprogram 130 goes to a Subfunction Test 17 decision block 1320.

In the Retrieve Project Identifier function block 1311, the PROJECT_IDENTIFIER is retrieved. The PROJECT_IDENTIFIER is one of the available "hidden" parameters that were stored in the Store Variables function block 102 of FIG. 1. The Project History subprogram 130 then proceeds to the Retrieve Project function block 1312 to retrieve information associated with the selected project having the PROJECT_IDENTIFIER retrieved in function block 1311. In the preferred implementation of the present invention, this retrieval is again achieved by constructing a simple SQL "select" statement, which is a well-established procedure. The select statement is passed to the SQL-compliant relational database, or equivalent system employed to store persistent information.

From the Retrieve Project function block 1312, the Project History subprogram 130 continues to a Retrieve Stage Number function block 1313. The function block 1313 retrieves the stage number which is an available "hidden" parameter that was stored in function block 102 of FIG. 1. Next, the subprogram 130 proceeds to a Generate Detailed Stage Page function block 1314. The function block 1314 generates HTML to display detailed information regarding the specific stage identified in function block 1313 for the project retrieved in function block 1312. The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

After the Generate Detailed Stage Page function block 1314, the Project History subprogram 130 proceeds on path 1350, to the connector C in FIG. 2B, then to the corresponding connector C' in FIG. 2A and on to the Generate Cookie function block 206, also in FIG. 2A.

When the subfunction is not "Display Stage," the Project History subprogram 130 proceeds to Subfunction Test 17 decision block 1320. The decision block 1320 is the seventeenth in the series of tests to determine which subfunction the control program 25 will execute in this subprogram 130. The decision block 1320 again employs the SUBFUNCTION_CODE retrieved in the Retrieve Subfunction function block 1300. If the subfunction is "Display Project," the subprogram 130 continues to a Retrieve Project Identifier function block 1321. If the subfunction is not "Display Project," the subprogram 130 goes to Generate Internal Error Page function block 1330. If the subfunction is not "Display Project," the SUBFUNCTION_CODE is erroneous, since all other possible subfunctions codes for the Project History subprogram 130 have been tested for.

The Generate Internal Error Page function block 1330 occurs when an unlisted subfunction is retrieved. As the subfunctions are generated internally, this shouldn't occur unless an internal error has occurred. The function block generates an HTML page indicating that this error has occurred, and then the subprogram 130 proceeds on path 1350, to the connector C in FIG. 2B, then to the corresponding connector C' in FIG. 2A and on to the Generate Cookie function block 206, also in FIG. 2A.

From the Subfunction Test 14 decision block 1320, when the subfunction "Display Project" was found, the subprogram 130 continues to a Retrieve Project Identifier function block 1321. In the Retrieve Project Identifier function block 1321, the PROJECT_IDENTIFIER is retrieved. The PROJECT_IDENTIFIER is one of the available "hidden" parameters that were stored in the Store Variables function block 102 of FIG. 1. The subprogram 130 then proceeds to the Retrieve Project function block 1322 to retrieve information associated with the selected project having the PROJECT_IDENTIFIER retrieved in function block 1321. In the preferred implementation of the present invention, this retrieval is achieved by constructing a simple SQL "select" statement, which is a well-established procedure. The select statement is passed to the SQL-compliant relational database, or equivalent system employed to store persistent information.

From the Retrieve Project History function block 1322, the Project History subprogram 130 continues to a Generate Brief Project History function block 1323. The function block 1323 generates an HTML page that includes a brief history of the specific project retrieved in the function block 1322. The preferred implementation constructs the display of each revisional stage in the specified project such that selecting the stage runs the control program 25. Additionally, as preferred, the function block 1323 specifies in "hidden" parameters, the number of the stage, the PROJECT_IDENTIFIER, a function of "Project History," and a subfunction of "Display Stage." The preferred implementation also includes a link or "submit" button and "hidden" parameters with the project's unique PROJECT_IDENTIFIER, a function of "Change Order Administration," and no subfunction. The link and submit button are HTML elements readily constructed by anyone skilled in the art of web page construction.

After the Generate Brief Project History function block 1323 generates the HTML page, the Project History subprogram 130 proceeds on path 1350 to the connector C in FIG. 2B, then to the corresponding connector C' in FIG. 2A and on to the Generate Cookie function block 206, also in FIG. 2A.

The Register subprogram 140 is schematically detailed in FIG. 14. A Retrieve Subfunction function block 1400 in FIG. 14 continues on path 261 from the decision block 260 in FIG. 2B, when the function is "Register." Function block 1400 retrieves from memory the SUBFUNCTION_CODE determined by the CGI parameters stored in the Store Variables function block 102. The SUBFUNCTION_CODE determines which of several possible subfunctions the control program will perform.

The Register subprogram 140 continues from function block 1400 to a Subfunction Test 18 decision block 1401. Decision block 1401 is the eighteenth of the series of tests to determine which subfunction the control program 25 will perform, using the SUBFUNCTION_CODE retrieved in function block 1400. If no function was specified, the subprogram 140 proceeds to a Generate Registration Page function block 1402. Otherwise, the subprogram 140 continues to a Subfunction Test 19 decision block 1410.

In the Generate Registration Page function block 1402 an HTML page is generated that allows the user to enter registration information. This HTML page includes CGI parameters specifying a function of "Register" and a subfunction of "Register." After generating the HTML page, the subprogram 140 proceeds on path 1450, to the connector C in FIG. 2B, then to the corresponding connector C' in FIG. 2A and on to the Generate Cookie function block 206, also in FIG. 2A.

From the Subfunction Test 18 decision block 1401, when the subfunction was specified the Register subprogram 140 proceeds to the Subfunction Test 19 decision block 1410. The decision block 1410 is the nineteenth in the series of tests to determine which subfunction the control program will perform, again employing the SUBFUNCTION_CODE that was retrieved in function block 1400. The decision block 1410 tests if the subfunction is "Register." If not, the SUBFUNCTION_CODE is erroneous, since all other possible subfunction codes for the Register subprogram 140 have been tested for. With this error, the subprogram 140 proceeds with a Generate Internal Error Page function block 1411. If the subfunction is "Register," the subprogram 140 goes to a Retrieve Registration Information function block 1420.

The Generate Internal Error Page function block 1411 occurs when an unlisted subfunction is retrieved. As the subfunctions are generated internally, this shouldn't occur unless an internal error has occurred. The function block 1411 generates an HTML page indicating that this error has occurred, and then the subprogram 140 proceeds on path 1450, to the connector C in FIG. 2B, then to the corresponding connector C' in FIG. 2A and on to the Generate Cookie function block 206, also in FIG. 2A.

In the Retrieve Registration Information function block 1420, the subprogram 140 retrieves the registration information entered by the user and included in the CGI parameters, which were first retrieved in the Parameters function block 101A and stored in the Store Variables function block 102, as shown in FIG. 1. The function block 1420 is followed by an Information Complete decision block 1421. The decision block 1421 tests if the registration information retrieved in step 1420 is complete. If the registration information is not complete, the Register subprogram 140 continues to a Generate Registration Page function block 1422. Otherwise, the information is complete and the subprogram 140 goes to a Retrieve Customer Identification function block 1430.

The Generate Registration Page function block 1422 generates an HTML page allowing the user to enter registration information. This HTML page includes error messages indicating that improper or incomplete registration information was entered in the previous registration attempt, and CGI parameters specifying a function of "Register" and a subfunction of "Register." After generating the HTML page in function block 1422, the subprogram 140 proceeds on path 1450 to the connector C in FIG. 2B, then to the corresponding connector C' in FIG. 2A and on to the Generate Cookie function block 206, also in FIG. 2A.

In the Retrieve Customer Identification function block 1430, the Register subprogram 140 retrieves the USER_IDENTIFIER stored in the function block 102, or the function block 106, as shown in FIG. 1. At the function block 1430, the user has already completed the registration process. A Generate Premium Code function block 1431 follows function block 1430. The function block 1431 generates a premium code that allows the user to receive something of value (e.g. $20 off their first project) in return for registering. The value offered by the premium may change or the premium may be removed as market forces dictate. The preferred implementation of the present program employs a simple counter appended to a Cyclic Redundancy Check (CRC) to generate the premium code. The generation of a CRC is known to those having skill in such programming tasks. Any method that generates a small, unique text string is considered suitable by the inventors.

The Register subprogram 140 continues from the function block 1431 to a Store Customer Information function block 1432. The function block 1432 stores the customer identifier, and relates it to the user identification. The preferred implementation employs an SQL-compliant relational database to store this information, although any persistent storage method is acceptable and considered as an alternative embodiment.

From function block 1432 the subprogram 140 proceeds to a Send Registration Notification function block 1433. Employing the customer identifier retrieved in function block 1430, and the registration information retrieved in step 1420, the function block 1433 sends a registration notification to the host or system administrator for billing and tracking purposes. In sending the notification the present invention preferably employs standard MIME-compatible e-mail messages, although any online notification method may be used. The construction and sending of a MIME-compatible e-mail message is a standard function known to anyone versed in the art. The function block 1433 is followed by a Generate Receipt Page function block 1434.

In the preferred embodiment, the Generate Receipt Page function block 1434 includes the generation of an HTML page containing a receipt for the user to print or save. The most preferred implementation generates a receipt including the user's registration information retrieved in the function block 1420 and the premium code generated in the function block 1431. Alternatively, other information may be included or removed from the receipt page as desired by the site administrator. After generating the HTML page, the subprogram 140 proceeds on path 1450 to the connector C in FIG. 2B, then to the corresponding connector C' in FIG. 2A and on to the Generate Cookie function block 206, also in FIG. 2A.

Figure 15:
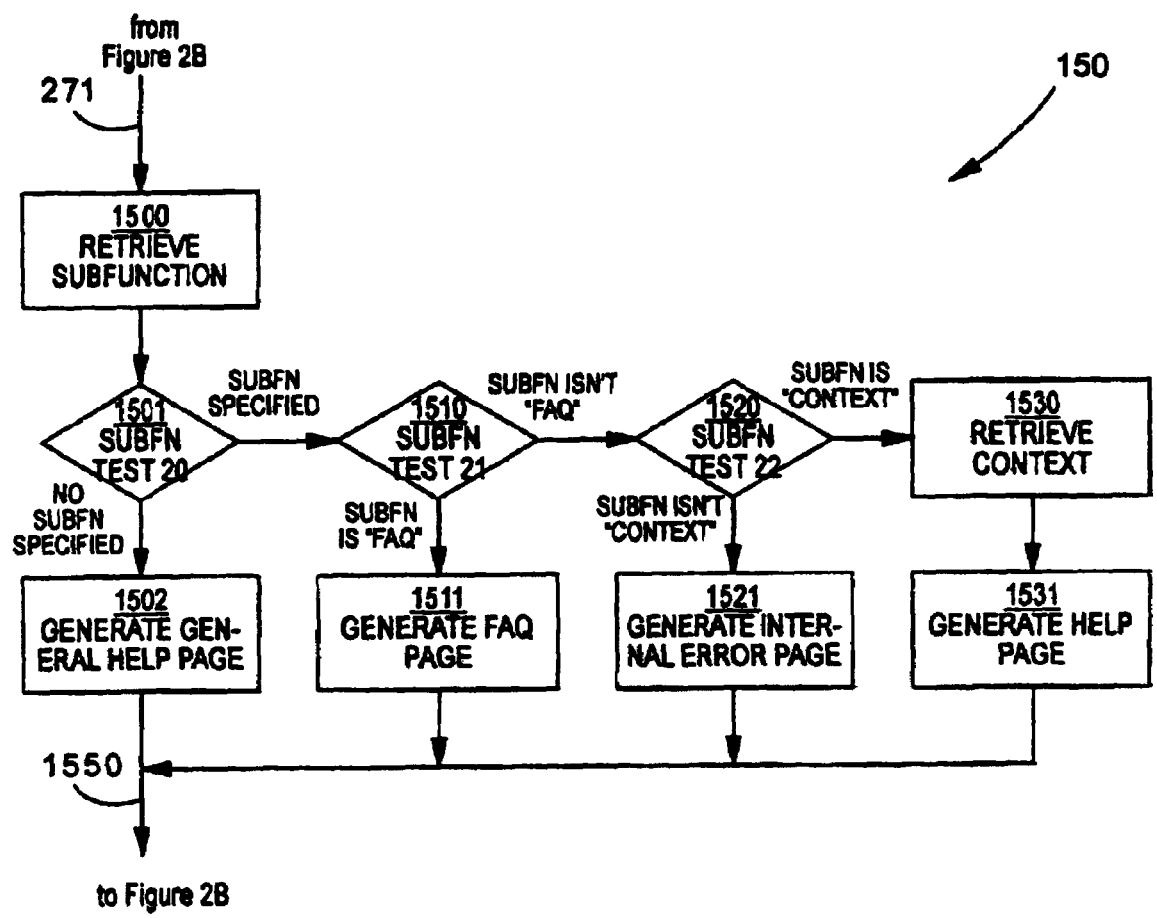
FIG. 15 is a flow diagram of the Help subprogram shown in FIG. 2B.
Figure 16:
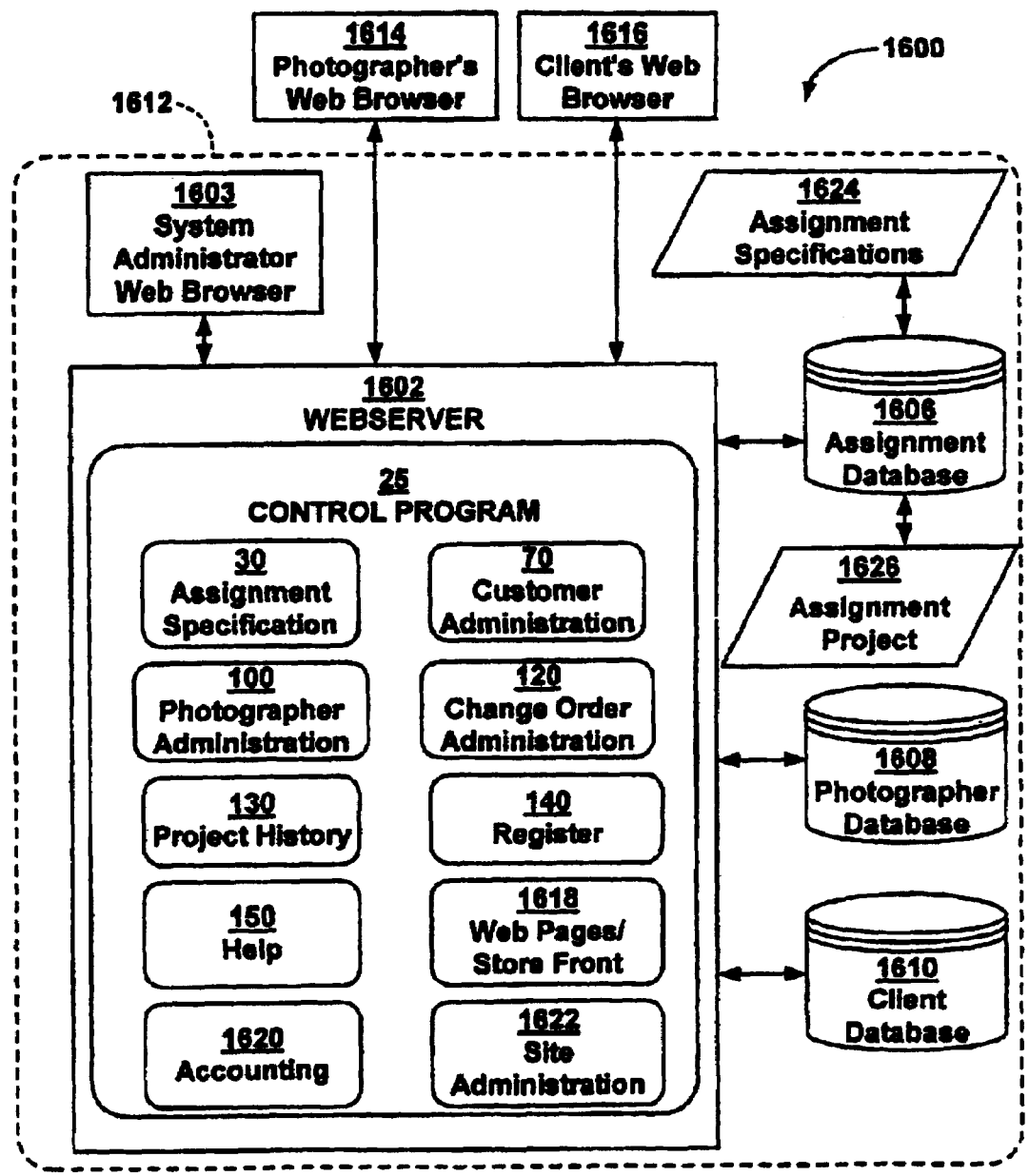
FIG. 16 is a flow diagram of the system architecture of the invention.

FIG. 15 details the Help subprogram 150 that first includes the execution of a Retrieve Subfunction function block 1500. The function block 1500 is reached by the path 271 from FIG. 2B. The function block 1500 retrieves from memory the subfunction code determined by the CGI parameters stored in the Store Variables function block 102. The subfunction code determines which of several possible subfunctions the control program will perform, based upon the state of the subfunction code.

A Subfunction Test 20 decision block 1501 then performs the twentieth in the series of tests to determine which subfunction the control program will perform, using the subfunction code retrieved in the Retrieve Subfunction function block 1500. If no subfunction was specified, the Help subprogram 150 proceeds to a Generate General Help Page function block 1502. Otherwise, the subprogram 150 proceeds to a Subfunction Test 21 decision block 1510.

In the Generate General Help Page function block 1502, an HTML page is generated that contains general help information. After generating this HTML page, the Help subprogram 150 proceeds on path 1550, to the connector C in FIG. 2B, then to the corresponding connector C' in FIG. 2A, and then on to the Generate Cookie function block 206, also in FIG. 2A.

The Subfunction Test 21 decision block 1510 is the twenty-first in the series of tests to determine which subfunction the control program will perform, again employing the subfunction code retrieved in function block 1500. If the subfunction is "FAQ" (Frequently Asked Questions, which is an Internet standard method of presenting help information in a question-and-answer format), the Help subprogram 150 continues to a Generate FAQ Page function block 1511. If the subfunction is not "FAQ," the subprogram 150 goes to a Subfunction Test 19 decision block 1520.

The Generate FAQ Page decision block 1511 generates an HTML page containing frequently asked questions and their answers. The contents of this page will vary as questions and answers are added, removed, or modified. After generating the FAQ HTML page, the Help subprogram 150 proceeds on path 1550, to the connector C in FIG. 2B, then to the corresponding connector C' in FIG. 2A, and then on to the Generate Cookie function block 206, also in FIG. 2A.

In the Subfunction Test 22 decision block 1520, the twenty-second and final test in the series of tests is performed to determine which subfunction the control program will perform. The decision block 1520 employs the subfunction code retrieved in the Retrieve Subfunction function block 1500. If the subfunction is not "Context," the subprogram 150 continues with a Generate Internal Error Page function block 1521. Otherwise, the subprogram 150 goes to a Retrieve Context function block 1530.

The Generate Internal Error Page function block 1521 executes when the subfunction is not "Context," which means that since "Context" is the only remaining subfunction in the help subprogram 150, an unrecognized subfunction has been received. As the subfunctions are generated internally, this shouldn't occur unless an internal error has occurred, so function block 1521 generates an HTML page indicating this has happened. After generating this HTML page, the subprogram 150 proceeds on path 1550, to the connector C in FIG. 2B, then to the corresponding connector C' in FIG. 2A, and then on to the Generate Cookie function block 206, also in FIG. 2A.

The Retrieve Context function block 1530 is executed when the subfunction is "Context" as determined by the decision block 1520. The function block 1530 retrieves the help context desired and included in the CGI parameters, which were first retrieved in the Parameters function block 101A and stored in the Store Variables function block 102, as shown in FIG. 1. The help context is included in a "hidden" parameter or a hyperlink specifying a function of "Help" and a subfunction of "Context" in each of the pages generated by the control program 25.

The Generate Help Page function block 1531 employs the context retrieved in the Retrieve Context function block 1530 to generate an appropriate help page. The preferred implementation uses the context to select help text from a set of files residing in the file system of the server hosting the control program. Alternate implementations may use other conventional methods of storing the help text. After generating the HTML page, the subprogram 150 proceeds on path 1550, to the connector C in FIG. 2B, then to the corresponding connector C' in FIG. 2A, and then on to the Generate Cookie function block 206, also in FIG. 2A.

FIG. 16 is a schematic of the preferred architecture of a system 1600 hosting the present invention. The system includes a Web Server 1602 that is preferably a commercially available, SSL2-compliant web server, such as Stronghold™ or Netscape™, and a control program 25, and preferably includes a database server. The database server runs a commercially available Relational Database Management System (RDBMS) such as Oracle™, Informix™, or Sybase™. Alternatively, a separate database server is utilized. The system also includes disk storage for storing images uploaded by clients and photographers, and for miscellaneous data used by the control program, web server, and operating system. Disk storage can include an Assignment Database 1606 for storing Assignment Specifications 1624 and Assignment Project 1626 input, the Photographer Database 1608, and a Client Database 1610. The Web Server, database servers and disk storage communicate over an industry-standard TCP/IP network, and all exist within a firewall 1612 to prevent unauthorized access.

The web server 1602 is accessed via a Photographer's Web browser 1614 or client's web browser 1616. Additionally, browsers 1603 running on computers connected to the local TCP/IP network within the firewall 1612 have access to the server for administration and development purposes.

The control program 25 may be written in any language or combination of languages providing access to the server environment, TCP/IP network, and RDBMS. Examples of such languages are C, C++, Perl, and Visual Basic. Access to the RDBMS is through language and RDBMS-specific APIs, which are familiar to anyone versed in the art. The control program includes one or more subprograms or operations, such as: Assignment Specification 30; Customer Administration 70; Photographer Administration 100; Change Order Administration 120; Project History 130; Register 140; Help 150; Web Pages or Store Fronts 1618; Accounting 1620; and Site Administration 1622.

The server 1602 runs on a workstation-class or better computer, such as a Sun™ UltraSPARC™ or Dec Alpha™, running a commercially available operating system, such as UNIX or Linux™, Windows NT™ or Macintosh OS™. The database server is also a workstation-class or better computer running the same or a different, commercially available operating system as the server computer. Disk storage is made available either through standalone, commercially available disk storage subsystems, or a workstation-class or better computer making available its local disk storage to other computers on the TCP/IP network. The control program 25 has no specific dependence upon the type of server, database server, or disk storage used, so the hardware may be upgraded as faster, more capable, and more technologically advanced systems become available without modifying the basic functioning of the control program.

The method of the present invention can also include a number of auxiliary functions, such as multiple servers for load-balancing and redundancy, a periodic backup system, redundant disk storage, an Uninterruptable Power Supply (UPS), system and server administration and reporting functions, redundant local and Internet network connections, etc. However, the control program 25 does not depend upon any of these auxiliary functions and can perform its basic functions regardless of whether any or all of them are present.

Final film delivery for the photographic work product can be through a mail carrier or online in scans or the photographer can scan and provide post-processing work with a final digital output product. All of these details of shipment and delivery can be arranged online, and incorporated within the system 1600, in which all transactions and communications are handled.

As an alternative to applying the present invention to conventionally defined commercial photographs, the inventors consider any work of two or three-dimensional visual communications as a broader example of a photograph. The interactive assignment of such works, employing the method of the present invention, is considered as an alternative embodiment of the present invention.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. A method of electronically generating and assigning a photographic project comprising the steps of:
receiving a photographic assignment request from a user, the photographic assignment request received by a control program, the control program based within a first server;
issuing a user identification by the control program, the user identification specifically corresponding to the user;
receiving a photographic assignment specification from the user, the photographic assignment specification received by the control program;
searching a photographer data base for a photographer;
generating with the control program, a search result including a photographer selection, the photographer selection corresponding to the photographic assignment specification received by the control program, and the photographer database stored within a second server;
transmitting the search result of the photographer selection to the user;
receiving an approval of the photographer selection from the user;
generating with the control program, a photograph request for the photographer;
transmitting the photograph request to the photographer;
receiving an image from the photographer;
generating with the control program, a photograph submittal for the user;
transmitting the photograph submittal to the user for review;
receiving a photograph review from the user;
generating a user review report for the photographer; and
transmitting the user review report to the photographer.

2. The process of claim 1, further comprising the steps of:

receiving with the control program, a photograph revision from the photographer, the photograph revision in response to a review by a user;

generating with the control program, a revised image for the user;

transmitting the revised image to the user for review and comment;

receiving with the control program, an approval from the user; and generating with the control program, an acceptance receipt to the photographer.

3. The method of claim 1, further comprising the steps of:

generating with the control program, an access code for the user; and authenticating access to the control program by the user by requiring the user to submit the access code to the control program.

4. The method of claim 1, wherein the step of transmitting the photograph request to the photographer further comprises the steps of:

generating with the control program, a photographer access code specifically for the photographer; and authenticating the photographer's access to the control program by requiring the photographer to submit the photographer access code to the control program.

5. The method of claim 1, further comprising the step of:

providing the user a photograph generation and assignment progress history.

6. The method of claim 1, wherein the step of transmitting the photograph request to the photographer further comprises the step of:

generating an e-mail message to the photographer, the e-mail message containing the project description and control program contact information.

7. The method of claim 1, wherein the step of transmitting the photograph submittal to the user further comprises the step of:

displaying a progress image to the user.

8. An electronic system for generating and assigning a photograph by a remotely located user with a remotely located photographer, the system comprising:

a control program associated with a server, the control program capable of communicating with a user and additionally capable of communicating with a remotely located photographer, the control program capable of receiving a request for a photographic assignment from the user;

a database associated with the control program, the database including a store of information relating to a photographer, the database searchable for a photographer having a criteria set that corresponds to the photographic assignment from the user; and an electronic interface to transmit a communication between the user and the photographer as manipulated by the control program, the communication including a photograph specification by the user and a response to the photograph specification by the user.

9. The electronic system of claim 8, further comprising:

an photographic revision received from the photographer, the photographic revision by the control program in response a review by a user;

a revised photograph generated with the control program, the revised photograph transmitted to the user for a review and comment;

an approval from the user received with the control program; and an acceptance receipt to the photographer generated with the control program.

10. The electronic system of claim 8, further comprising:

an access code for the user, the access code generated with the control program; and an authentication for access to the control program by the user, the authentication achieved by requiring the user to submit the access code to the control program.

11. The electronic system of claim 8, further comprising:

a photographer access code specifically generated for the photographer, the photographer access code generated with the control program; and an authentication of an access by the photographer to the control program by requiring the photographer to submit the photographer access code to the control program.

12. The electronic system of claim 8, further comprising:

a photograph generation and assignment progress history, provided to the user by the control program.

13. The electronic system of claim 8, further comprising:

an e-mail message to the photographer, the e-mail message generated by the control program, and the e-mail message containing a project description and control program contact information.

14. The electronic system of claim 8, further comprising:

a progress photograph displayed to the user by the control program.

* * * * *